US011522390B2

(12) United States Patent
Zeine et al.

(10) Patent No.: US 11,522,390 B2
(45) Date of Patent: Dec. 6, 2022

(54) WIRELESS POWER TRANSMISSION FOR NEAR AND FAR FIELD APPLICATIONS

(71) Applicant: Ossia Inc., Bellevue, WA (US)

(72) Inventors: Hatem Ibrahim Zeine, Bellevue, WA (US); Alireza Pourghorban Saghati, Los Gatos, CA (US); Siamak Ebadi, San Francisco, CA (US)

(73) Assignee: Ossia Inc., Redmond, WA (US)

( * ) Notice: Subject to any disclaimer, the term of this patent is extended or adjusted under 35 U.S.C. 154(b) by 0 days.

(21) Appl. No.: 17/097,725

(22) Filed: Nov. 13, 2020

(65) Prior Publication Data

US 2021/0135493 A1    May 6, 2021

Related U.S. Application Data

(63) Continuation of application No. 15/619,869, filed on Jun. 12, 2017, now abandoned.
(Continued)

(51) Int. Cl.
*H02J 50/10* (2016.01)
*H02J 50/23* (2016.01)
(Continued)

(52) U.S. Cl.
CPC .............. *H02J 50/12* (2016.02); *H02J 50/10* (2016.02); *H02J 50/23* (2016.02); *H02J 50/90* (2016.02);
(Continued)

(58) Field of Classification Search
CPC ........ H02J 50/10; H02J 50/23; H02J 7/00036; H02J 50/12; H02J 50/90; H04B 5/0037; H04B 7/0682
(Continued)

(56) References Cited

U.S. PATENT DOCUMENTS

| 5,400,037 A | 3/1995 | East |
| 8,159,364 B2 | 4/2012 | Zeine |
| (Continued) | | |

FOREIGN PATENT DOCUMENTS

EP    3014740 A2    5/2016

OTHER PUBLICATIONS

International Application No. PCT/US2017/036956, International Search Report & Written Opinion, 11 pages, dated Aug. 22, 2017.
(Continued)

*Primary Examiner* — Toan T Vu

(57) ABSTRACT

The disclosed wireless transmitter estimates a client location in space and transmits power in the form of electromagnetic (EM) waves to that location. In response to receiving the power, a client sends a power request signal. In some implementations, the power request signal includes a request that the wireless transmitter transmit more power to the client. In response to the power request signal, the wireless transmitter can modify the power transmitted to the client to increase/decrease the amount of power the client is receiving. For example, the wireless transmitter can modify the emitted EM waves to increase coherent addition or decrease coherent addition at the location of the client to increase the amount of power the client receives. In some implementations, the wireless transmitter modifies the phase distribution of EM waves to increase the amount of power a client receives.

20 Claims, 12 Drawing Sheets

Related U.S. Application Data

(60) Provisional application No. 62/348,792, filed on Jun. 10, 2016.

(51) Int. Cl.

| | | |
|---|---|---|
| *H04M 5/00* | (2006.01) | |
| *H04M 7/06* | (2006.01) | |
| *H02J 50/12* | (2016.01) | |
| *H02J 50/90* | (2016.01) | |
| *H04B 5/00* | (2006.01) | |
| *H04B 7/06* | (2006.01) | |

(52) U.S. Cl.
CPC ......... *H04B 5/0037* (2013.01); *H04B 7/0682* (2013.01)

(58) Field of Classification Search
USPC ........................................................ 307/104
See application file for complete search history.

(56) References Cited

U.S. PATENT DOCUMENTS

| | | |
|---|---|---|
| 8,410,953 B2 | 4/2013 | Zeine |
| 8,446,248 B2 | 5/2013 | Zeine |
| 8,558,661 B2 | 10/2013 | Zeine |
| 8,854,176 B2 | 10/2014 | Zeine |
| 10,153,653 B1* | 12/2018 | Bell ................... H02J 5/005 |
| 10,506,601 B2* | 12/2019 | Kim ................... H04W 52/0235 |
| 2008/0153433 A1 | 6/2008 | Pallonen et al. |
| 2008/0265087 A1 | 10/2008 | Quinn et al. |
| 2008/0303714 A1 | 12/2008 | Ezal et al. |
| 2010/0259447 A1 | 10/2010 | Crouch |
| 2010/0315045 A1 | 12/2010 | Zeine |
| 2011/0025133 A1 | 2/2011 | Sauerlaender et al. |
| 2012/0274154 A1* | 11/2012 | DeLuca ................... H02J 50/23 |
| | | 307/149 |
| 2012/0326660 A1 | 12/2012 | Lu et al. |
| 2013/0154558 A1 | 6/2013 | Lee et al. |
| 2014/0217967 A1 | 8/2014 | Zeine et al. |
| 2015/0042526 A1 | 2/2015 | Zeine |
| 2016/0033254 A1 | 2/2016 | Zeine et al. |
| 2016/0127012 A1 | 5/2016 | Shylendra et al. |
| 2016/0156388 A1 | 6/2016 | Zeine et al. |
| 2016/0190870 A1 | 6/2016 | Nagamine et al. |
| 2016/0191121 A1 | 6/2016 | Bell et al. |
| 2016/0197522 A1 | 7/2016 | Zeine et al. |
| 2016/0248270 A1 | 8/2016 | Zeine et al. |
| 2016/0299210 A1 | 10/2016 | Zeine |
| 2016/0299549 A1 | 10/2016 | Zeine et al. |
| 2016/0301259 A1 | 10/2016 | Zeine et al. |
| 2016/0365754 A1 | 12/2016 | Zeine et al. |
| 2017/0104374 A1 | 4/2017 | Zeine et al. |
| 2017/0149294 A1 | 5/2017 | Wight et al. |
| 2018/0090992 A1* | 3/2018 | Shrivastava ............ H02J 50/20 |

OTHER PUBLICATIONS

Taiwanese Patent Application No. 106119432, Office Action, 23 pages, dated Dec. 3, 2018.
European Patent Application No. 17931778.9, Extended European Search Report, 12 pages, dated Jun. 8, 2021.
Japanese Patent Application No. 2020-524810, Office Action, 10 pages, dated Jun. 15, 2021.

* cited by examiner

WIRELESS POWER TRANSMISSION FOR NEAR AND FAR FIELD APPLICATIONS

CROSS-REFERENCE TO RELATED APPLICATION

This application is a continuation of U.S. patent application Ser. No. 15/619,869, filed Jun. 12, 2017, which claims priority to U.S. Provisional Patent Application No. 62/348,792, filed Jun. 10, 2016, titled "Wireless Power Transmission For Near And Far Field Applications," the entireties of which are incorporated by reference herein for all purposes.

BACKGROUND

Power is essential for electronic devices. Currently, most users charge devices by connecting a device to a power supply with wires, but wires are restrictive. Because of this restriction, companies have developed wireless power. Wireless power involves transmitting power from a source in the form of an electric field, magnetic field, or electromagnetic radiation (e.g., light, microwave radiation, etc.). Wireless power frees devices from wires and aims to allow users to enjoy the mobility and freedom of mobile electronics.

The majority of activity in area of wireless power transmission has occurred in inductive coupling technology. Inductive coupling technology is based on magnetic induction. In magnetic induction, wireless power transfer requires two coils: a transmitter coil and a receiver coil. An alternating current in the transmitter coil generates a magnetic field that induces a voltage in the receiver coil. This voltage is transferred to the power sink to power an electrical load or to charge a power source, such as a battery in a smartphone. However, inductive coupling technology is not efficient because most of the energy is transmitted into space and not received by the intended devices. Additionally, the coils involved in wireless power transmission need to be in close proximity to (e.g., a few inches) or physically touching each other, which truly limits the concepts of mobility and freedom intended by wireless power.

Accordingly, a need exists for technology that overcomes the problem demonstrated above, as well as one that provides additional benefits. The examples provided herein of some prior or related systems and their associated limitations are intended to be illustrative and not exclusive. Other limitations of existing or prior systems will become apparent to those of skill in the art upon reading the following Detailed Description.

SUMMARY

Various embodiments of the present technology generally relate to wireless charging. More specifically, some embodiments relate to wireless power transmissions for near and far field applications. Some embodiments provide for a method for transmitting wireless power to one or more client devices. In some embodiments, a wireless power transmitter can send power into space from an antenna aperture. The power transmitter can then receive a feedback signal from a receiver. The feedback signal can include information related to power received at the receiver or client device. Based on the feedback signal, the wireless power transmitter can send power with a modified phase distribution from the antenna aperture. The modified phase distribution can, for example, be computed based, at least in part, on a distance from the antenna aperture to an estimated location of the receiver that provided feedback signal.

In some embodiments, the wireless power transmitter can receive one or more additional feedback signals that requests an increase or decrease in received power. In response, the wireless power transmitter can send more or less power in the next power transmission signal. The wireless power transmitter may also receive a power request signal provided by the receiver that includes power data and movement data indicating acceleration or velocity of the receiver. In some embodiments, the wireless power transmitter can scan through space (e.g., a local environment) with electromagnetic waves to determine a location of the receiver relative to the antenna aperture. The receiver may be near-field, far-field, in direct line of sight or out of direct line of sight.

Some embodiments include methods for operating a receiver. These methods can include identifying a power transmission signal sent into space from an antenna aperture of a wireless power transmitter. In addition, the receiver can generate a feedback signal. The feedback signal can include a variety of information (e.g., information related to power received at the receiver, desired power, location, etc.). Additional power transmission signals with modified phase distribution (e.g., based on the feedback signal, scanning sequence, etc.) can be transmitted from the antenna aperture of the wireless power transmitter. In some embodiments, the receiver can transmit a power request signal that includes power data and movement data indicating acceleration or velocity of the receiver. The receiver may include a global positioning system which can identify a location of the receiver that can be transmitted to the wireless power transmitter. The receiver may be in a non-line of sight path to the antenna aperture.

Embodiments of the present invention also include computer-readable storage media containing sets of instructions to cause one or more processors to perform the methods, variations of the methods, and other operations described herein.

In some embodiments, the wireless power transmitter can include a memory, a processor, a location estimator, a phase adjuster, an antenna array, an antenna aperture, a communications component, a scanning module, a feedback module, and/or a mapping module. The location estimator cab estimate a location of a client device relative to the wireless power transmitter (e.g., a distance and angle). In some embodiments, the location estimator uses responses from the scanning module to determine the location of the client device relative to the antenna aperture. The phase adjuster can compute, based on the location estimate of the client device, a phase distribution of a power transmission. The antenna array can send the power transmission with the phase distribution calculated by the phase adjuster. The communications component (e.g., Bluetooth) can receive a variety of communication signals (e.g., a power request signal from the client device and a feedback signal from the client device). The scanning module can cause the antenna array scanning through space with electromagnetic waves. The mapping module can be used to create a map of a local environment of the wireless power transmitter.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

This Summary is provided to introduce a selection of concepts in a simplified form that are further described below in the Technical Disclosure. It may be understood that this Summary is not intended to identify key features or essential features of the claimed subject matter, nor is it intended to be used to limit the scope of the claimed subject matter.

BRIEF DESCRIPTION OF THE DRAWINGS

Embodiments of the present technology will be described and explained through the use of the accompanying drawings.

Figure 1:
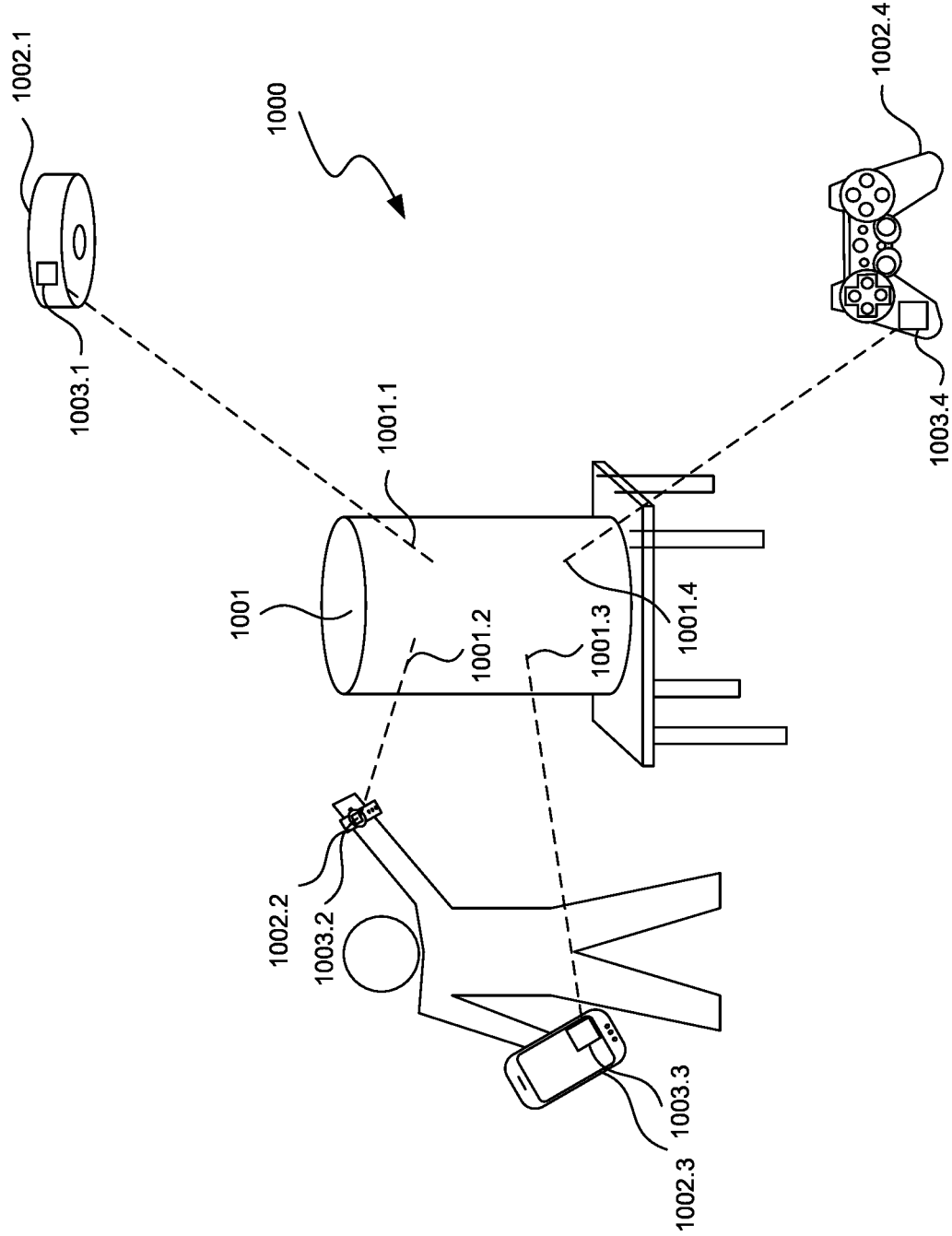
FIG. 1 illustrates a wireless power environment in accordance with various embodiments of the present technology.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Various embodiments of the present technology generally relate to wireless charging. More specifically, some embodiments relate to wireless power transmissions for near and far field applications. In accordance with various embodiments, a wireless transmitter can estimate a client location in space and transmit power in the form of electromagnetic (EM) waves to that location. In response to receiving wireless power, a client (also referred to as a "receiver") can transmit a power request signal to the wireless transmitter indicating the client needs more power. To focus power on a location in space, the wireless transmitter can adjust the phase distribution of the antenna elements at the transmitter to make the EM signals add up coherently at that location in space. Also, the wireless transmitter can sweep (e.g., scan) through a space with EM waves to determine the location of the receiver and direct power towards that location.

In some embodiments, the wireless transmitter can modify a phase distribution of the EM signals transmitted to the client using phase shifters connected to the antennas in the wireless transmitter. Modifying the phase of emitted EM waves can result in more coherent addition of EM waves arriving at the client location and increase the amount of power the client is receiving. Articulated differently, the wireless transmitter radiates power from multiple points of an aperture and these individual power signals sum up at a specific client location. Since the waves emitted from the aperture travel different lengths to reach the client, the waves can arrive with different phases. To compensate for the difference in path length and/or phase, the wireless transmitter can apply different phase distributions or adjustments to different parts of the aperture to increase (e.g., maximize or optimize) power received at a client location. While phase variation is one method, some embodiments of the wireless transmitter can also use time delay to achieve similar results.

To compute how to modify phase distribution and thus increase the amount of power a client receives, the wireless transmitter can determine or map an estimated position of a client in space relative to an aperture and estimates the distance between the aperture and the client. Based on the mapping to the aperture and estimated distance, the wireless transmitter can calculate a phase distribution that can result in coherent addition (e.g., maximum or optimum power transfer) at the location of the client. For example, the wireless transmitter can estimate that a client is located 0.5 meters away from an aperture with a 0.5 centimeter offset from the aperture. Based on these estimations, the wireless transmitter transmits power to the client with a phase distribution that results in coherent addition (also referred to as "summation" or "coherent add up") at the client location. As used herein, coherent addition refers to EM waves combining that are in phase or nearly in phase. In response to the client receiving some power, the client can transmit a power request signal reporting whether the client is receiving an adequate amount of power to charge or operate. Based on this power request signal, some embodiments of the wireless transmitter further modify the phase distribution of power transmitted to the client.

The wireless transmitter can integrate feedback from a client. For example, initially the wireless transmitter transmits power based on a first estimated client location (e.g., the wireless transmitter assumes a client is a certain distance away from the transmitter with no offset from an aperture). In response to transmitting power based on the first estimate, the wireless transmitter receives a power request signal that indicates the client is not receiving adequate power. Then, the wireless transmitter computes a second estimation. For example, if the wireless transmitter computed a first estimate that the client is very close (e.g., less than 0.5 meters), but the power request signal indicated the client received a small amount of power (e.g., less than 0.1 W), the client can compute a second estimate that the client is far away (e.g., more than 0.5 meters) and transmit power with a modified phase distribution such that coherent add up can occur farther away. In general, the wireless transmitter can continue in a feedback loop and vary phase distribution based on an estimated location of a client until the client is receiving an adequate (e.g., local maximum) amount of power.

Additionally, the power request signal can include not only power data, but also additional information in the feedback loop. For example, a client can include an accelerometer and the client can report changes in velocity in the feedback loop. In such an example, the wireless transmitter can use Doppler effect equations to vary the phase of power transmitted to a wireless device that is moving and thus increase the amount of coherent addition (or decrease the amount of coherent add up) at the client location.

Various embodiments of the present technology provide for a wide range of technical effects, advantages, and/or improvements to computing systems, electronic devices and components. One expected advantage is that the wireless charger is simply varying the phase distribution of transmitted power in response to a power request signal requesting more power, which can be done quickly and with less computation compared to a radar system. Additionally, unlike radar technology that uses a reflective area to send power to objects, the disclosed technology can avoid using a reflective area. Instead, the disclosed technology estimates a client's location based on location equations and quickly iterates through different solutions to find a phase distribution that provides adequate or increased power to a device. Furthermore, radar requires digital signal processing of reflected signals, which is an intensive and resource-demanding process that the disclosed technology may avoid.

Another expected advantage is that the disclosed technology can transmit power to a client that is close to the transmitter (e.g., a few centimeters) or far from the transmitter (e.g., a few meters). Even more, the disclosed technology provides a feedback loop for electronic devices to request varying amounts of power, which results in fine tuning and optimization. Other expected advantages will become apparent to those having ordinary skill in the art when reading this Detailed Description. Moreover, not all advantages are required to implement the disclosed technology.

In a sample use case of the system, a client is receiving 0.1 W of power from a wireless transmitter and needs to receive 0.2 W; accordingly, the client transmits a power request signal requesting an increase in power delivery. In response to receiving the power request signal, the wireless transmitter modifies the phase distribution of power transmitted to the client to increase the amount of power the client is receiving. The wireless transmitter modifies the phase distribution based on approximating the distance between the client and the aperture of the wireless transmitter and adjusting the EM waves to coherently add at the location of the client. In response, if the client receives 0.2 W of power with the modified phase distribution, the client sends a power request signal that requests to continue receiving power until the client does not need any more power (e.g., full charge). If the client is receiving less than 0.2 W of power, the client sends another power request signal requesting a modification in power. In response to this power request signal, the wireless transmitter can continue to adjust the phase distribution of power transmitted to the receiver until the receiver is receiving an adequate amount of power. If after a certain number of iterations (e.g., 10) the required power level for the receiver cannot be reached, the transmitter can choose a predetermined level of power (e.g., maximum or optimal power level based on previous iterations or a default power level) to transmit to the receiver for a predetermined period of time (e.g., 10 minutes). After the predetermined period of time, the wireless transmitter can again try to modify the phase distribution to increase the amount of coherent addition arriving at the desired location (e.g., receiver location) in space.

The techniques described herein utilize wireless technologies to deliver power, data or both. In some implementations, power, data, or both may be delivered simultaneously as a continuous complex waveform, as a pulsed waveform, as multiple overlapping waveforms, or combinations or variations thereof. The power and data may be delivered using the same or different wireless technologies.

In the following description, for the purposes of explanation, numerous specific details are set forth in order to provide a thorough understanding of embodiments of the present technology. It will be apparent, however, to one skilled in the art that embodiments of the present technology may be practiced without some of these specific details. While, for convenience, embodiments of the present technology are described with reference to wireless charging functionality using electromagnetic waves, but also are applicable to sound waves, and/or other forms of periodic excitations (e.g., phonons). Electromagnetic waves may include radio waves, microwaves, infrared radiation, visible light, ultraviolet radiation, X-rays, and/or gamma rays. Sound waves may include infrasound waves, acoustic waves, and/or ultrasound waves. The techniques described herein may simultaneously utilize multiple wireless technologies and/or multiple frequency spectrums within a wireless technology to deliver the power, data or both. In some implementations, the wireless technologies may include dedicated hardware components to deliver power and/or data. The dedicated hardware components can be modified based on the wireless technology, or combination of wireless technologies, being utilized. For example, when applied to sound waves, the system employs microphones and speakers rather than antennas.

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

I. WIRELESS CHARGING ENVIRONMENT

FIG. 1 illustrates a wireless power environment. In environment 1000, a wireless transmitter 1001 (also known as "wireless charger," "charger," "transmitter," or "array of antennas") wirelessly transmits power to various wireless devices 1002.1-1002.4 (also referred to herein as a "wireless power receiver," "client," or "target"). As an example, environment 1000 can be an office space with a wireless transmitter in the middle of the space with several electronic devices (e.g., mobile phones and wearable device) throughout the space and within range of the transmitter. In some implementations, wireless transmitter 1001 can transfer power in any direction. For example, dashed lines 1001.1-1001.4 represent directions that wireless transmitter 1001 can transfer power. One with ordinary skill in the art will appreciate that environment 1000 can have multiple wireless transmitters and multiple wireless devices.

While not shown in FIG. 1, wireless transmitter 1001 can include a single antenna or multiple antennas. For example, wireless transmitter 1001 can include an antenna array with hundreds or thousands of antennas that are capable of delivering wireless power to wireless devices 1002.1-1002.4. Alternatively, transmitter 1001 can include a single antenna. The chip and antennas inside of a wireless charger 1001 are described in more detail in U.S. patent application Ser. No. 15/094,963, titled "WIRELESS CHARGING WITH MULTIPLE POWER RECEIVING FACILITIES ON A WIRELESS DEVICE," filed on Apr. 8, 2016, which is incorporated in its entirety for all purposes. Additionally, wireless transmitter 1001 can include antennas that are adaptively phased radio frequency (RF) antennas and can utilize a novel phase shifting algorithm as described in one or more of U.S. Pat. Nos. 8,558,661, 8,159,364, 8,410,953, 8,446,248, 8,854,176; U.S. patent application Ser. Nos. 14/461,332 and 14/815,893; and U.S. Provisional Patent Application Nos. 62/073,917, 62/086,481, 62/100,007, 62/118,381, 62/146,233, 62/163,964, and 62/173,891, all of which are hereby incorporated by reference in their entirety for all purposes.

Wireless transmitter 1001 can be capable of determining the appropriate phases to deliver a coherent power transmission signal to the wireless devices. In some implementations, the wireless transmitter 1001 can include a time delayed retrodirective radio frequency (RF) holographic array that delivers wireless RF power that matches client antenna patterns in three-dimensional space (e.g., polarization, shape, and power levels of each lobe antenna lobe).

In addition to the antenna or antennas included in wireless transmitter 1001, wireless transmitter 1001 can include other components to change the phase of EM waves emitted from the antenna or antennas in the analog or digital domain. For example, wireless transmitter 1001 can include analog phase shifters that provide variable phases controlled by a voltage (e.g., capacitor or inductor). Also, in some embodiments, electrically controlled analog phase shifters can be realized with diodes. Alternatively, wireless transmitter 1001 can operate in the digital domain. For example, wireless transmitter 1001 can include digital phase shifters that provide a discrete set of phase states that are controlled by two-state phase bits. In such an example, the highest order bit is 180 degrees, the next highest is 90 degrees, then 45 degrees, etc., as 360 degrees is divided into smaller and smaller binary steps. Additionally, in some implementations, a three-bit phase shifter would have a 45-degree least significant bit (LSB), while a six-bit phase shifter would have a 5.625-degree LSB. Also, wireless transmitter 1001 can include analog-to-digital (ADC) or digital-to-analog (DAC) converters.

As shown in FIG. 1, wireless devices 1002.1-1002.4 can be a variety of devices. The wireless devices 1002.1-1002.4 can be any (intelligent or passive) wireless device or system that needs power and is capable of receiving wireless power such as a smoke detector 1002.1, wearable electronic 1002.2, mobile phone 1002.3, or wireless game controller 1002.4. As discussed herein, the wireless devices can be coupled to one or more integrated power receiver clients 1003.1-1003.4 or "wireless power receivers" to receive and process power from wireless transmitter 1001. Other examples of wireless devices 1002.1-1002.4 include a server computer, a desktop computer, a laptop computer, a handheld computer, and other electronic devices. The wireless devices 1002.1-1002.4 can also be any wearable device such as a smart watch, necklace, ring, or biometric sensor, or even a device embedded on or within a person (e.g., an implantable sensor). Other examples of wireless devices 1002.1-1002.4 include, but are not limited to, safety sensors (e.g., carbon monoxide), electric toothbrushes, electronic door locks/handles, electric light switch controllers, and electric shavers. Also, in some implementations, the wireless devices 1002.1-1002.4 can communicate with each other via Bluetooth™, Wi-Fi, ZigBee™, etc.

As illustrated in FIG. 1, each integrated power receiver client 1003.1-1003.4 can include one or more antennas (not shown) for receiving power and signals from wireless transmitter 1001 and for transmitting power request signals. Also, integrated power receiver clients 1003.1-1003.4 are described in more detail in U.S. patent application Ser. No. 15/094,963, titled "WIRELESS CHARGING WITH MULTIPLE POWER RECEIVING FACILITIES ON A WIRELESS DEVICE," filed on Apr. 8, 2016, which is incorporated in its entirety for all purposes.

As shown in FIG. 1, wireless devices 1002.1-1002.4 can include integrated power receiver clients 1003.1-1003.4 that transmit power request signals. In general, the power request signal can include a request to receive more power from a wireless transmitter. The power request can also include an indication of the amount of power received and an indication that the receiver is receiving an adequate amount of power. In some embodiments, a power request signal can be a continuous waveform.

Alternatively, the power request signal can be a modulated signal. The power request signal can include information such as the amount of power a wireless device has received or is receiving (e.g., 0.5 W), the rate at which the received power is charging the device, the phase or frequency detected by the receiver when it receives the power signal, or the amount of power the device needs to receive to reach a full or adequate charge. Additionally, a power request signal can include the location of the device (e.g., global positioning (GPS) coordinates) or the rate at which a receiver is moving (e.g., using an accelerometer). A wireless device can deliver a power request signal sporadically, periodically, or continuously to request power, and the power request signal can include information (e.g., velocity, frequency of power received, amplitude of power received) that is used to compute how to send power to a wireless device.

In some implementations, wireless transmitter 1001 can also deliver wireless communication data signals to wireless devices 1002.1-1002.4. The wireless power and wireless communication data signals can be delivered as a combined power and communication signal. While the Detailed Description provided herein focuses on wirelessly transmitting power, aspects of the invention are equally applicable to wirelessly transmitting data. In some implementations, the data communication antennas can communicate via Bluetooth™, WiFi, ZigBee™, etc.

The client devices 1002 shown in FIG. 1 may be enabled to communicate with transceiver systems 1001 and other communication devices (e.g., WiFi and cellular networks). Client devices 1002 may transmit beacon signals. The transceiver system 1001 may be configured to determine the appropriate phases to transmit coherent power signals to the client power receivers 1002. Antenna arrays can transmit a signal (e.g., a continuous wave or a pulsed power transmission signal) from each of the plurality of antenna elements at a specific phase relative to each other.

Although not illustrated in FIG. 1, each of the above listed components (e.g., client power receivers 1002, transceiver system 1001, etc.) can include control and synchronization mechanisms, such as a data communication synchronization module. In some embodiments, the client power receivers 1002 and/or the transceiver systems 1001 utilize or encounter reflective surfaces such as, for example, walls or other RF reflective obstructions within range to beacon and deliver and/or receive wireless power and/or data within wireless communication and power delivery environment.

II. SCHEMATIC ILLUSTRATIONS

Figure 2A:
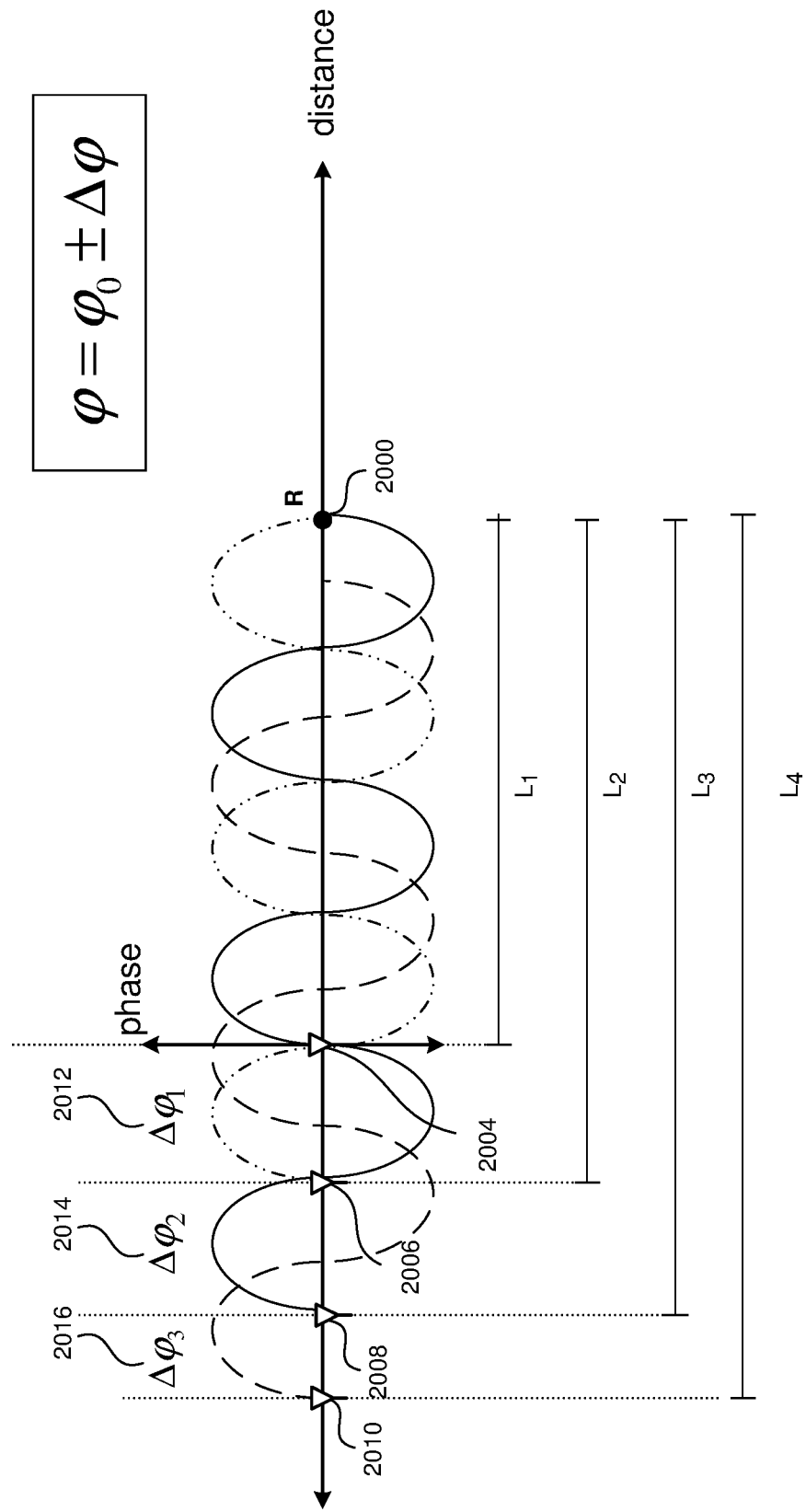
FIGS. 2A, 2B, 2C, and 2D are schematic diagrams illustrating phase distribution with antenna elements that may be used in one or more embodiments of the present technology.

FIG. 2A is a schematic diagram illustrating antenna elements with a phase distribution to help illustrate some principles involved in the disclosed system. FIG. 2A includes antenna elements 2004, 2006, 2008, and 2010; client 2000; and phase differences 2012, 2014, and 2016 with respect to the same frequency signal transmitted by each antenna element. As shown in FIG. 2A, client 2000 is located a distance $L_1$ away from the antenna element 2004; a distance $L_2$ from antenna element 2006; a distance $L_3$ from antenna element 2008; and a distance $L_4$ from antenna element 2010. As an example, client 2000 can be 2 meters (e.g., $L_1$=R=2 m) away from antenna element 2004. In such an example, antenna element 2004 can also be 10-20 cm away from antenna element 2006. In general, wireless transmitter 1001 can include any number of antennas and a uniform or different spacing between antenna elements and/or antennas—all of which can be a design factor based on a desired implementation in which the transmitter will be used.

An antenna element is a part of a single antenna that is radiating energy from multiple points. For example, antenna elements 2004, 2006, 2008, and 2010 may all be part of a single antenna that is radiating power from different antenna element locations. Alternatively, each antenna element 2004, 2006, 2008, and 2010 may be a separate antenna in an array of antennas. For example, antenna elements 2004, 2006, 2008, and 2010 may all be spaced equally (e.g., every 5 cm) or unequally (e.g., spacing starting at 1 cm and increasing by 1 cm). In other implementations, antenna elements can be spaced in a pattern or shape. For example, the antenna elements can be spaced in a square, rectangular, or circular pattern.

As can be seen from FIG. 2A, the antenna elements can concurrently emit EM waves with equal amplitudes and frequencies, but the EM waves arrive at client 2000 in different phases. Because the distance between each antenna and a certain location in space varies, waves emitted from different antennas reach that location in space with different phases. For example, antenna elements 2004, 2006 and 2010 each emit an EM wave with the same amplitude and at the same frequency, but the waves emitted from antenna elements 2006 and 2010 are farther away from client 2000 (e.g., $L_4$-$L_1$) than antenna element 2004, and due to this difference in distance, waves may incoherently arrive at the location of interest and interfere with each other because of the difference in phase. In contrast, antenna element 2008 is located at a distance with respect to client 2000 such that emitted waves from this element arrive in phase with emitted waves from antenna element 2004 and result in coherent arrival which likely results in coherent addition of the signals. Coherent addition increases the amount of power client 2000 receives. In general, the coherent and incoherent arrival of waves emitted from multiple antenna elements creates a distribution of phases at different points in space, which is considered phase distribution. The wireless transmitter has antennas configured to emit waves with different phase distributions to cause coherent or incoherent arrival of signals to a location in space.

Related to phase distribution, FIG. 2A illustrates the phase difference. As shown in FIG. 2A, the antenna elements 2004, 2006, 2008, and 2010 are emitting waves with the same frequency, and these waves are traveling toward client 2000, which is a distance $L_1$ away from antenna element 2004. Phase difference, $\Delta\varphi$, is a difference expressed in degrees, radians, or time between two EM waves referenced to a point in time. For example, two EM waves that have the same frequency and no phase difference are in-phase (i.e., no phase difference, $\Delta\varphi$=0). In contrast, two EM waves that have the same frequency and different phases have a phase difference $\Delta\varphi$=x, where x is the difference in phase (e.g., in seconds or degrees) between the two waves.

As shown in FIG. 2A, antenna elements 2004, 2006, 2008, and 2010 are emitting waves with a phase difference. Antenna element 2004 is emitting an EM wave with a phase of $\varphi_0$=0°; antenna element 2006 is emitting an EM wave with a phase difference 2012 of $\Delta\varphi_1$=180° or $\pi$ compared to that of antenna element 2004; and antenna element 2008 is emitting an EM wave with a phase difference 2014 of $\Delta\varphi_2$=360° or $2\pi$ (i.e., in phase) compared to that of antenna element 2004. Also, antenna element 2010 has a phase difference 2016 of $\Delta\varphi_3$ proportional to the difference of $L_4$-$L_1$. Also, antenna element 2006 is a distance $L_1$+($L_2$-$L_1$) away from client 2000. So, in some implementations, if antenna element 2004 and antenna element 2006 emit an EM wave at the same frequency at the same time, then the wave emitted from antenna element 2006 will arrive at client 2000 with a phase difference of $\Delta\varphi_1$=180° or $\pi$. As an example, from the perspective of client 2000 in FIG. 2A, if the phase difference is 180 degrees (or $\pi$ radians) between two received waves, then the two received waves are out of phase or antiphase. In general, the wireless transmitter controls the phase difference as described in more detail in FIGS. 3A-3D.

In terms of radiation, the near field and far field of an antenna are regions where different parts of the electromagnetic field are less or more important. The boundary between these two regions is determined based on the geometric dimensions of the antenna and the operating wavelength $\lambda$. In the near field region, the angular field distribution is mainly dependent on the distance from the radiator.

For small antennas where width is smaller than the operating wavelength $\lambda$, the near field is generally defined as the region within r<<$\lambda$, while the far field is the region for which r>>$\lambda$, where r is the radius away from the antenna. The boundary between the two regions for electrically larger antennas can be calculated as: $r_{far\ field}$=$2 \times D^2/\lambda$, where D is the main dimension. A part of the near field (also known as the Fresnel region) is an interactive region. The near field itself is also subdivided into the reactive near field and the radiative near field where the relationship between the intensities of the electric and magnetic (E and H) fields is too complex to predict. Hence, depending on the dimensions of the antenna topology in use and the operating frequency, the power signal computations and system designs may be different for far-field and near-field situations.

Figure 2B:
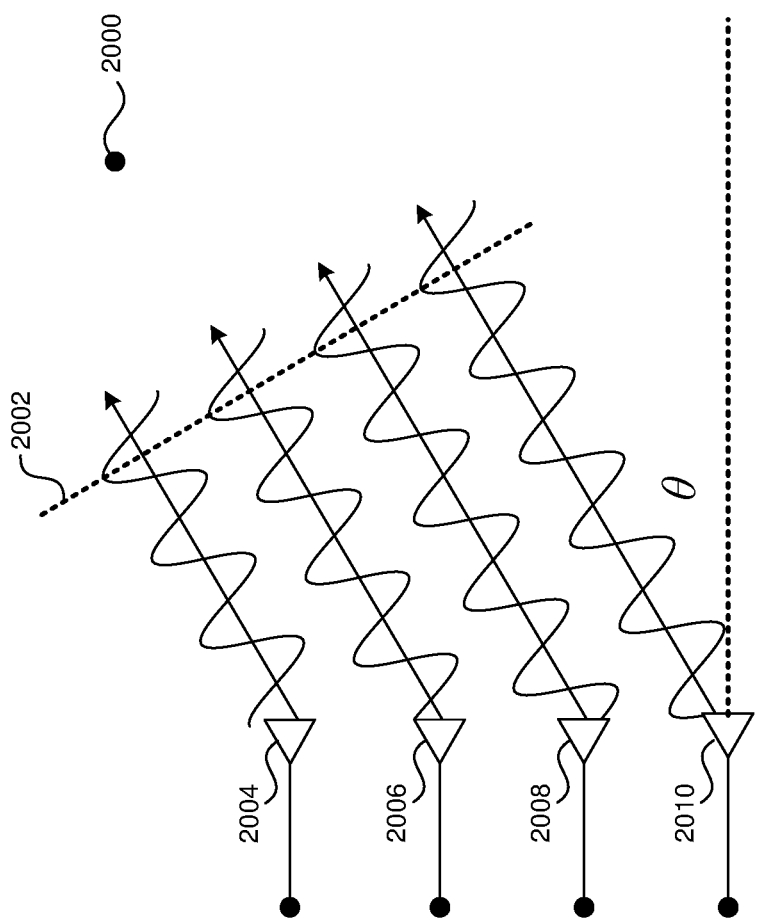

Similar to FIG. 2A, FIG. 2B shows a client 2000 and antenna elements 2004, 2006, 2008, and 2010 emitting waves resulting in a phase distribution. In contrast to FIG. 2A, FIG. 2B shows antenna elements 2004, 2006, 2008, and 2010 in a different spatial arrangement compared to FIG. 2A. At centerline 2002, the emitted waves are in phase, and thus may coherently add their power at the location of a receiver if it were positioned at 2002. In general, FIG. 2 illustrates that a wireless transmitter can modify the phase distribution of antennas elements to direct energy towards a client as shown in FIG. 2B. As shown in FIG. 2, the wireless transmitter has adjusted the phases of antenna elements such that the EM waves coherently travel at angle θ as shown in FIG. 2B.

Figure 2D:
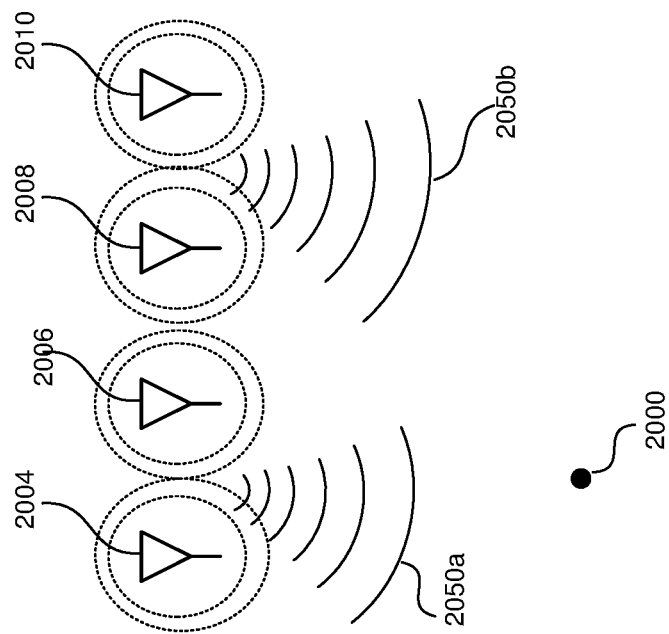
Figure 2C:
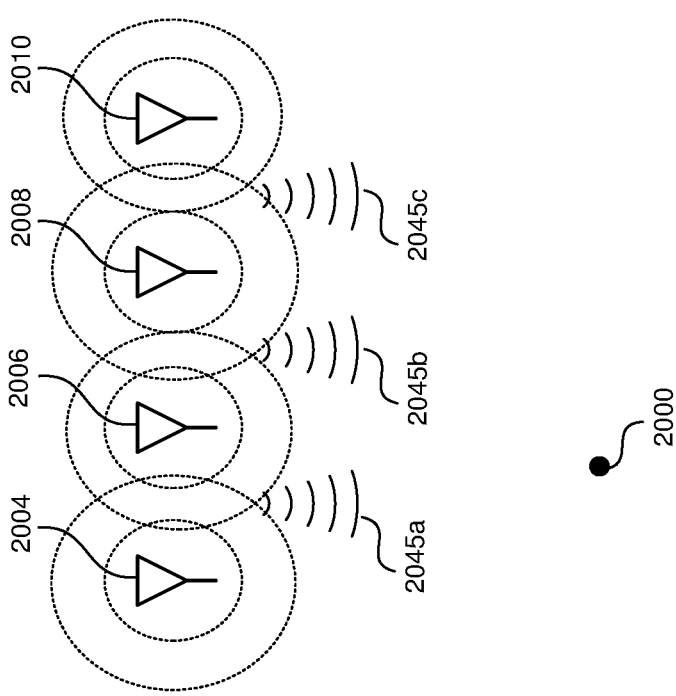

Similar to FIG. 2B, FIGS. 2C and 2D each have antenna elements 2004, 2006, 2008, and 2010 emitting EM waves as shown by the circular dashed lines in FIG. 2C. In some implementations, the emitted EM waves will coherently and incoherently combine to form the wave fronts 2045a-c. Comparing FIG. 2C with FIG. 2D, the antenna elements 2004, 2006, 2008, and 2010 in FIG. 2D have a different phase distribution than the antenna elements in FIG. 2C and thus combine to create different wave fronts 2050a-b with different phase distributions that coherently interfere at different angles or locations. Additionally, in FIG. 2C-2D, closely spaced dashed circles represent a tight phase distribution and distantly spaced dashed circles represent a large phase distribution.

Figure 3A:
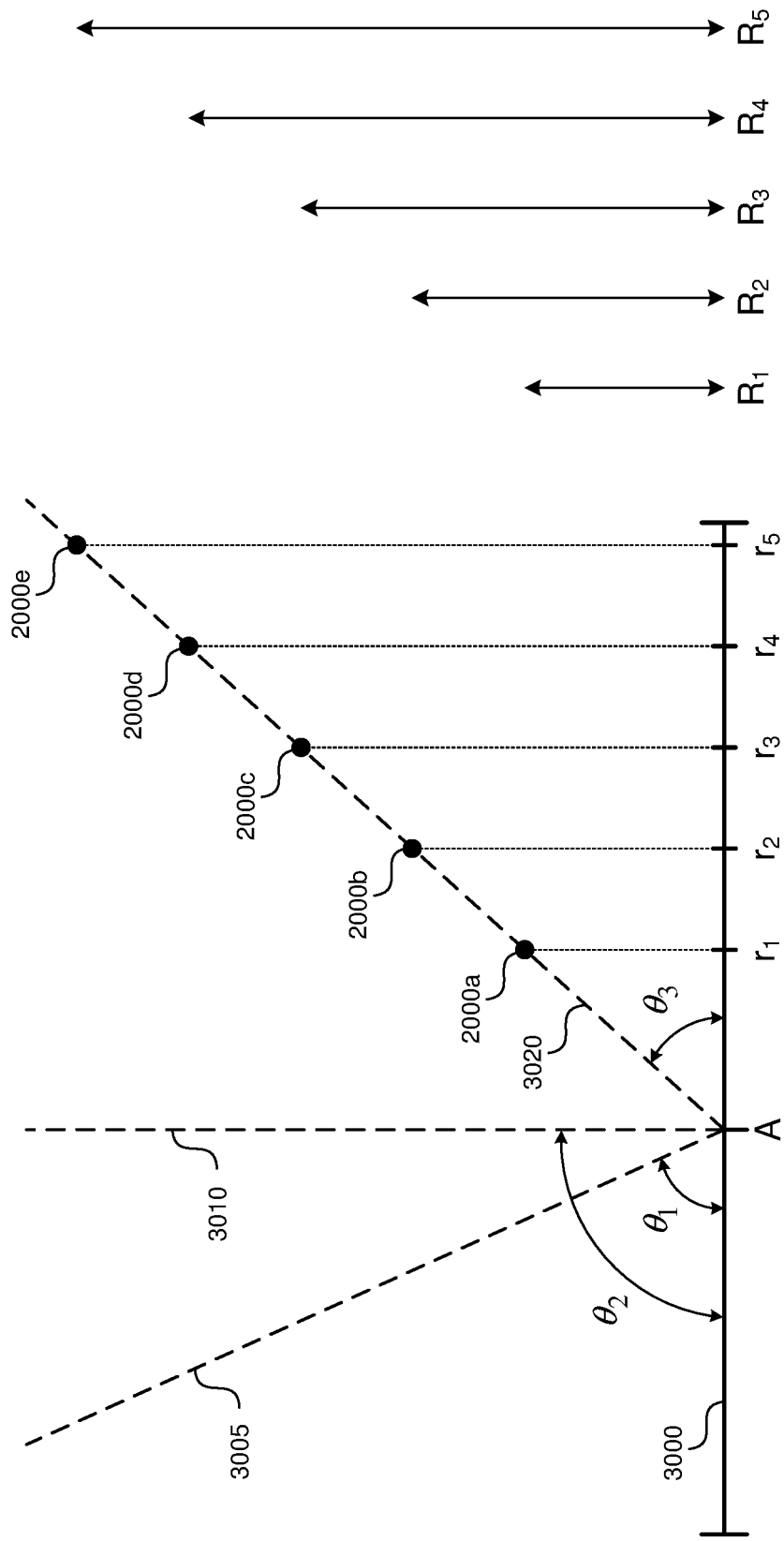
FIGS. 3A and 3B are side views illustrating transfer of wireless power from an aperture to a client that may be used in one or more embodiments of the present technology.

Building on the details of phase distribution from FIGS. 2A-2D and considering an antenna aperture, FIG. 3A is a side view diagram illustrating the transfer of wireless power from an antenna aperture of a transmitter to a client. As shown in FIG. 3A, an aperture 3000 can emit power in multiple directions such as 3005, 3010, or 3020 at an angle $\theta_1$, $\theta_2$, and $\theta_3$ relative to aperture 3000; a client 2000 can be located any distance away from aperture 3000 as shown by 2000a, 2000b, 2000c, 2000d, or 2000e. The horizontal distance can be a distance $r_1$, $r_2$, $r_3$, $r_4$, and $r_5$ away from point A, an arbitrary or center point on aperture 3000. The vertical distance (also known as range or R) can be $R_1$, $R_2$, $R_3$, $R_4$, and $R_5$ away from point A on aperture 3000. As described in more detail below, the wireless charger can adjust the angle (e.g., $\theta_1$, $\theta_2$, and $\theta_3$) that power is transmitter from aperture 3000 and adjust the location (e.g., $(r_1,R_1)$ or $(r_2,R_2)$) at which coherent EM waves are focused.

Figure 3B:
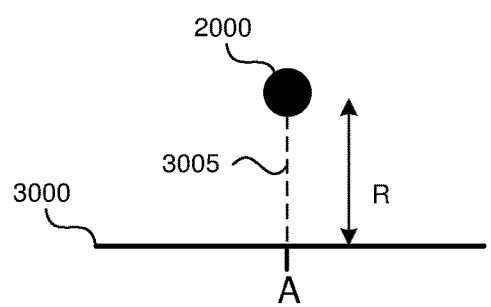

FIG. 3B is a side view that includes an aperture 3000, a centerline 3005 of the aperture, and a client 2000 that is located a distance R away from the aperture 3000. As shown in FIG. 3A, the center of the aperture 3000 (shown by "A" in FIG. 3B) and the center of the client 2000 location are aligned. As a client 2000 moves farther from or closer to the aperture 3000 (e.g., increasing or decreasing R), the client 2000 receives waves with a varying phase distribution (e.g., as shown in FIG. 2A).

The aperture 3000 is a source of EM waves that follow the Huygens-Fresnel principle and may be an area of antenna elements. The Huygens-Fresnel Principle states that, at a given instant, every point on any wavefront behaves as a "new" source of secondary spherical waves. The resultant amplitude at a given position in the scattered field is the vector sum of all the individual amplitudes. As explained herein, the wireless transmitter can first determine the (unknown) angle of a client relative to the aperture and then, find the (unknown) range to a client. The wireless transmitter may sweep periodicity of an applied phase distribution until a matched periodicity is found (e.g., through feedback from the receiver, such as a maximum power being received provided in a power request signal). This feedback from the receiver can be used to determine whether the transmitter needs to continue the sweep or the required power level is achieved at the receiver location. In general, matching periodicity refers to EM waves arriving at client in a coherent phase distribution (e.g., as shown in FIG. 2B) to increase (e.g., optimize) coherent addition.

The angle of the client relative to the aperture can be determined using one of the smart signal processing algorithms to identify the direction of arrival (DOA) which can be considered one of the key spatial signatures of the signal. This information can be used to compute the beamforming vectors (a technique used to generate a desired radiation pattern by constructively adding the phases of the signals in the direction of the client). Examples of techniques used to estimate the DOA include, but not limited to, Multiple Signal Classification (MUSIC), Estimation of Signal Parameters via Rotational Invariance, Matrix Pencil, and other statistical algorithms.

An example of a technique that may be used by some embodiments to determine the distance of the client may be Time of Flight (ToF) which involves transmitting an identifiable stream of bits from the transmitter and echoing it back from the client then measuring either the phase differences of the transmitted and received signals or the time elapsed for the roundtrip. This process can be done either passively or actively.

Figure 3C:
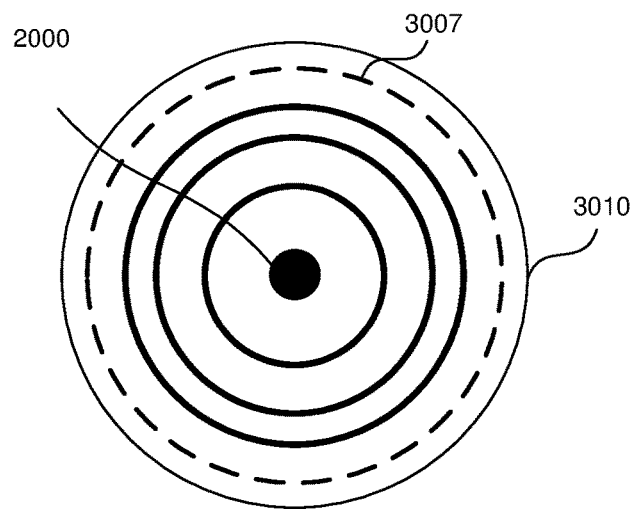
FIGS. 3C, 3D, and 3E are top view diagrams illustrating transfer of wireless power with a phase distribution of EM waves over an aperture projection that may be used in one or more embodiments of the present technology.

FIG. 3C is a diagram illustrating phase distribution of EM waves over the wireless transmitter aperture from a top view. FIG. 3C has a client 2000, an aperture projection 3007 of aperture 3000 (represented with a dashed line), and concentric phase circles 3010. Concentric circles 3010 represent EM waves with a phase distribution emitted by the wireless charger. As shown in FIG. 3C, the concentric circles 3010 are symmetric and concentric with the aperture's center, in such a position the client is not "offset" from the aperture center.

In general, FIG. 3C illustrates the phase distribution needed on the antenna aperture to illuminate the antenna radiation in the direction of the receiver, which is above the aperture and located at the center. The wireless charger can modify the phase distribution emitted by altering the phase of waves emitted from antenna elements in the wireless charger by applying different amplitudes of power and phase distributions to the individual elements of the antenna array in order to manipulate the level of side lobes, in addition to the directivity and direction of the main lobe. EM waves that are inside the aperture projection 3007 are bold and represent the actual phase distribution that will be used by the aperture (e.g., generated by the wireless transmitter).

Figure 3D:
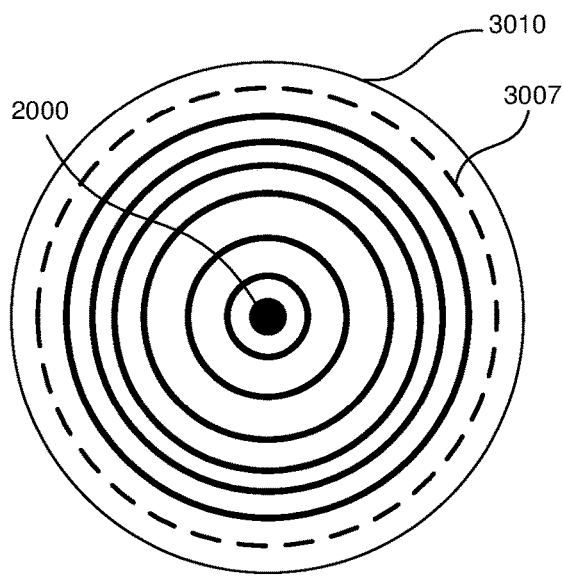
Figure 3E:
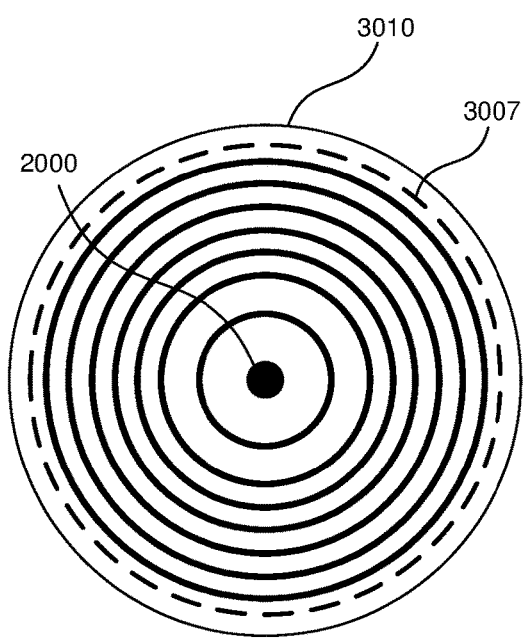

FIG. 3D is a diagram illustrating the phase distribution of EM waves over an aperture projection. FIG. 3D includes a client 2000, aperture projection 3007, and concentric circles 3010. Comparing FIG. 3C to FIG. 3D, FIG. 3D shows an aperture projection 3007 with a different aperture size and different phase distribution (more tightly spaced circles). Similar to FIG. 3D, FIG. 3E is a diagram illustrating phase distribution of EM waves over the transmitter aperture projection. FIG. 3E shows an aperture projection 3007 with a different aperture size and different phase distribution.

Figure 3F:
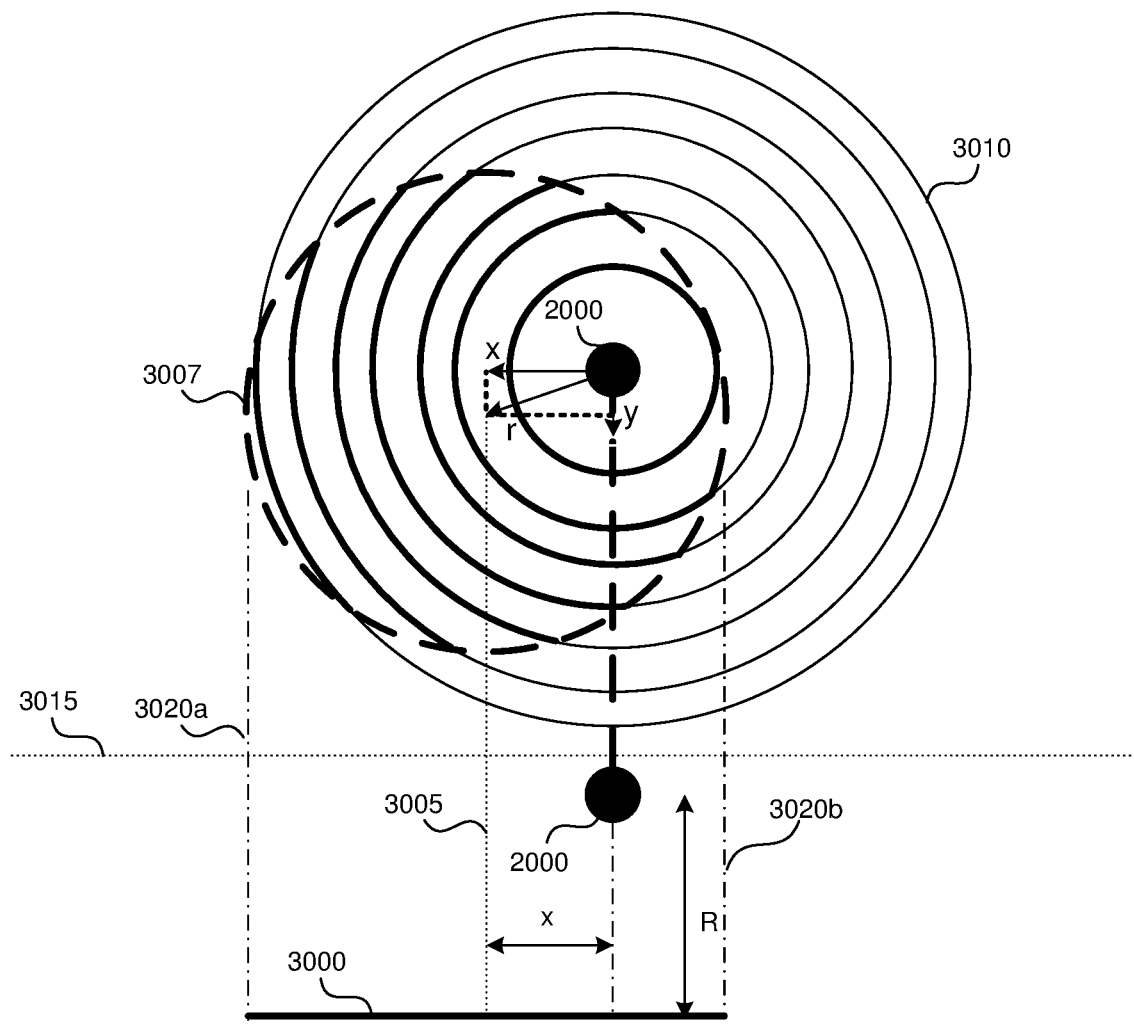
FIG. 3F illustrates the transfer of wireless power from top and side views where the client is offset from the center of the aperture that may be used in one or more embodiments of the present technology.

In contrast to FIGS. 3B-3E, FIG. 3F illustrates the transfer of wireless power where the client is offset from the center of the aperture (e.g., r is greater than zero). Offset is the linear distance between the center of the aperture and a location of the client on the aperture. A client can be offset in the horizontal or vertical direction. FIG. 3F includes a client 2000, aperture centerline 3005, an aperture projection 3007, concentric circles 3010, dividing line 3015, and guidelines 3020a-b. The dividing line 3015 illustrates a separation between the top view and the side view in FIG. 3F. The guidelines 3020a-b can be used to map locations of the top view to side view.

Overall as shown in FIG. 3F, the client 2000 is not at the center of the aperture projection 3007 and as a result, the phase distribution required on the aperture are portions of concentric circles 3010 with a different center than the center of the aperture. The concentric circles 3010 with a phase distribution inside the projection (represented with bold lines) of the aperture 3007 can be used by the transmitter to deliver power in the direction of the receiver of the client 2000.

In addition, the location of the client 2000 relative to the center of the aperture projection 3007 can be described by x, y, and r, where x is a horizontal distance from the client center to the aperture projection, y is a vertical distance from the client center to the aperture projection, and r is the resulting combination of vectors x and y. In other words, x or y are one dimensional and r is two dimensional. The following equations describe how client location, aperture projection, phase distribution, and wave number are correlated. As described in more detail below, r is zero when the center of an aperture projection and the center for a client are the same. As a client moves away from the center of an aperture, the value of r can change according to the equations below:

$$\phi = k\sqrt{R^2 + r^2} \quad \text{Equation 1}$$

$$r = \sqrt{x^2 + y^2} \quad \text{Equation 2}$$

$$k = \frac{2\pi}{\lambda} \quad \text{Equation 3}$$

$$d = \sqrt{R^2 + r^2} \quad \text{Equation 4}$$

The definition of variables in the above equations is as follows: (1) phase ($\varphi$); (2) k is a wave number, which can be calculated by Equation 3; (3) R is the range of the client from the aperture (e.g., in meters), (3) r is the distance from the client center to the aperture projection, which can be calculated using Equation 2, where x and y are horizontal and vertical distances respectively; (4) $\lambda$ is wavelength (e.g., wave length of a radio frequency EM wave), and (5) d is the actual physical distance between the client and the center of the aperture. A visual representation of these equations is shown in FIG. 3F.

Figure 3G:
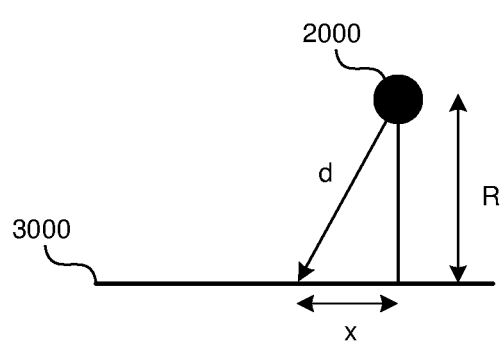
FIG. 3G illustrates a physical distance between a client center and an aperture projection that may be used in one or more embodiments of the present technology.

FIG. 3G illustrates a physical distance between a client and center of an aperture. FIG. 3G includes a client 2000 and the aperture 3000. FIG. 3G also includes d, R, and x. R and x are defined with respect to equations 1-3 above, and "d" is the physical distance between a client and the center of an aperture projection.

Figure 3H:
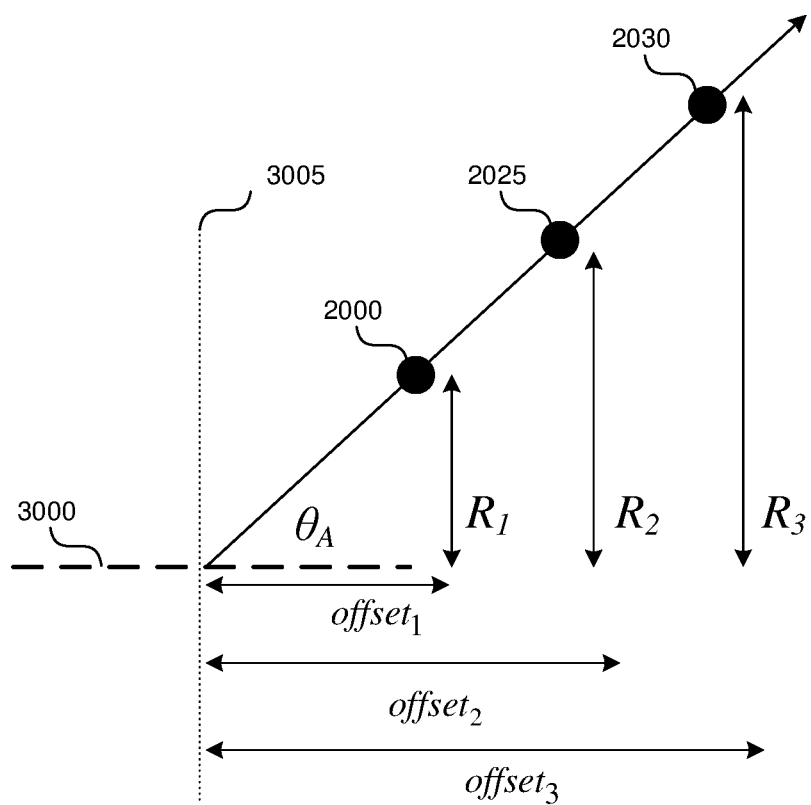
FIGS. 3H and 3I illustrate the relationship between a client, aperture, offset, angle of arrival, and phase distribution that may be used in one or more embodiments of the present technology.

FIG. 3H is a graphical illustration of the relationship between a client and the angle of arrival. As shown in FIG. 3H, a client 2000 can be located along the angle of arrival, $\theta_A$ (also known as "direction of arrival"). For example, clients 2000, 2025, and 2030 are located at ranges $R_1$, $R_2$, and $R_3$, respectively, from the aperture 3000 and have offsets from the centerline 3005 of the aperture 3000 of $offset_1$, $offset_2$, and offsets, respectively. As described in more detail in FIG. 4, a wireless transmitter can use some sort of a direction of arrival (DOA) algorithm to sweep through the space and find the right angle to transmit power to the client. Then once the angle for transmitting power to the client is known, the wireless transmitter changes the periodicity of the concentric phase distribution to find the offset of the receiver and thus increase (e.g., maximize) the received power by the receiver. In other words, transmitter uses two sets of sweeps to determine the maximum power delivery condition to the receiver. First, the sweep to find the direction of the receiver and second the concentric circles periodicity sweeps to find the distance of the receiver to the aperture.

Figure 3I:
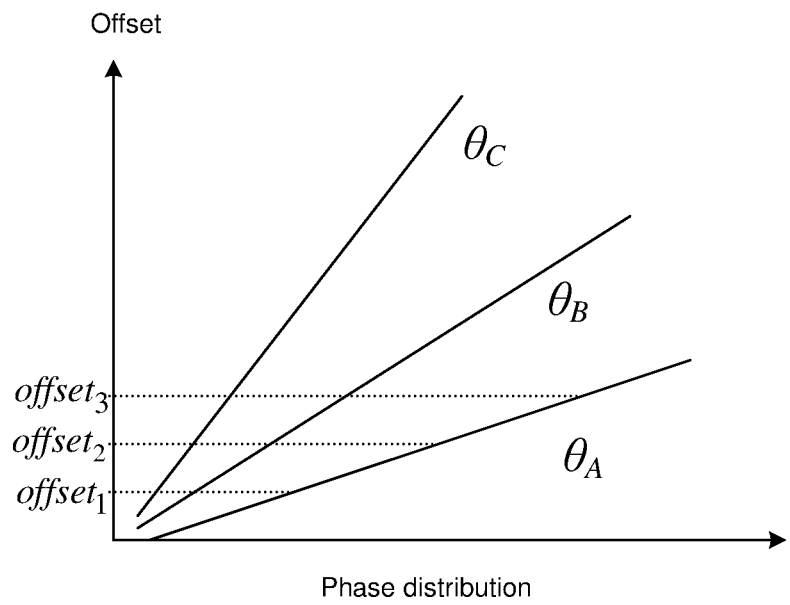

FIG. 3I shows a relationship between phase distribution, offset, and angle of arrival. The wireless transmitter can store this information in memory, and when the angle is known, and the wireless transmitter is executing a sweeping algorithm to send power to a client in space, these relationships can be used to make sweeping the periodicity of the phase distribution circles faster. In a sample use of the system, the wireless transmitter can sweep (e.g., search for a receiver) along an angle of arrival (e.g., $\theta_A$, $\theta_B$, $\theta_C$) to determine a phase distribution to transmit to a receiver. Each angle of arrival has a different geometry that a transmitter can use in determining location of a receiver.

Figure 4:
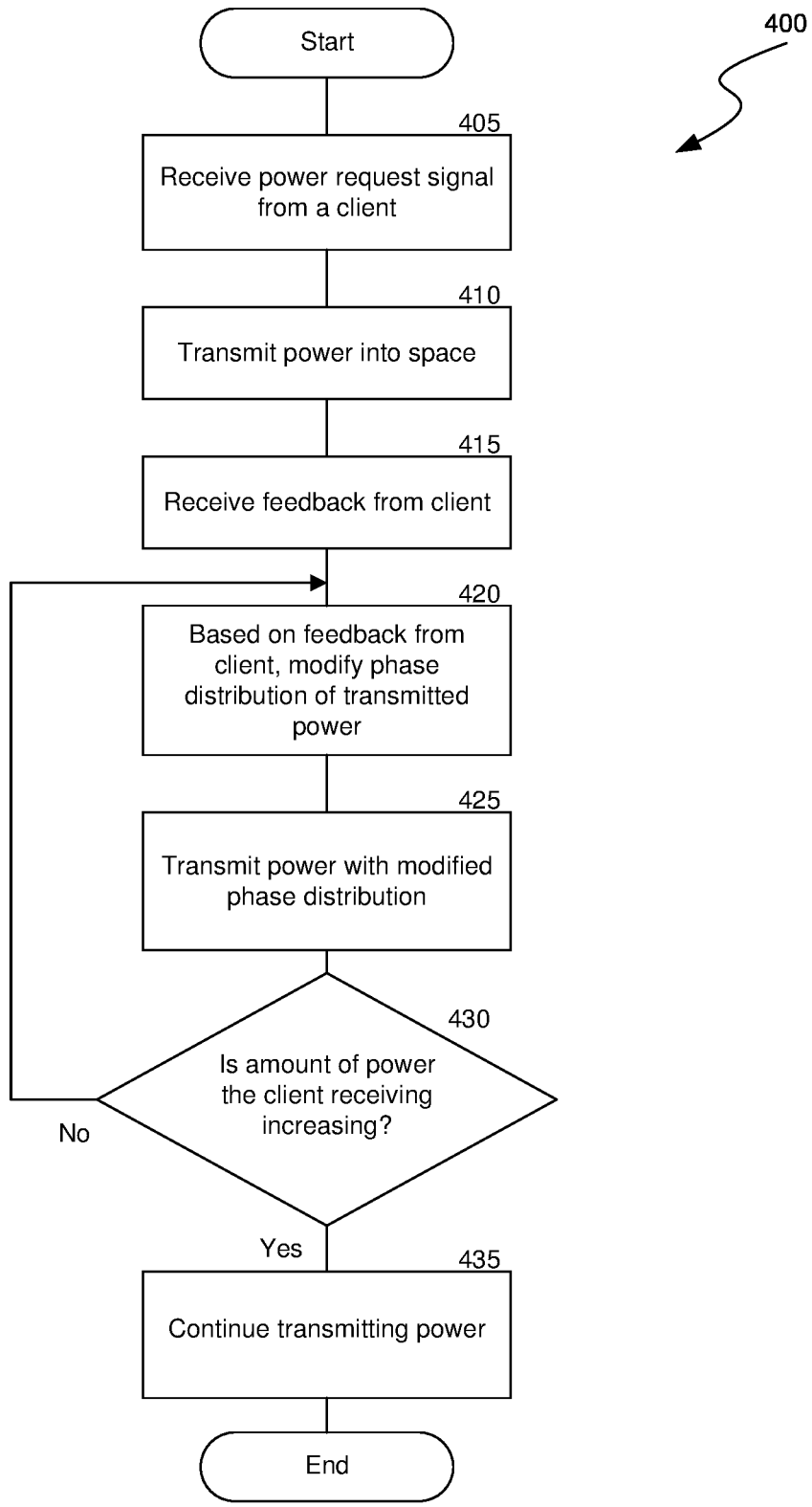
FIG. 4 is a flow diagram illustrating a set of operations for transmitting wireless power to a client that may be used in one or more embodiments of the present technology.

FIG. 4 is a flow diagram for transmitting wireless power to a client. In general, process 400 can begin when a receiver requests power. For example, a receiver can send a Bluetooth™, Zigbee™, or Wi-Fi power request signal that includes a request to receive 0.5 W of power. Alternatively, process 400 can start after the wireless transmitter transmits power into space and a client receives some power and requests additional power. In general, process 400 involves tuning (e.g., modifying phase) a wireless power signal that is transmitted to a client.

At block 405, a wireless transmitter receives a power request signal requesting power. For example, a mobile device with 10% battery life requests to receive power. The device can request this power by transmitting a Bluetooth™ signal requesting a wireless transmitter in a nearby room to send it power. As another example, an office space could have multiple tablets that have varying levels of battery life (e.g., 10% to 90%) and each tablet can transmit a power request signal requesting power. The wireless transmitter can receive all these power request signals. In implementations with multiple wireless devices or multiple wireless transmitters, the disclosed technology can implement the principles of superposition to efficiently transmit power to each wireless device.

At block 410, a wireless transmitter transmits power into space from an aperture. For example, the wireless transmitter selects a range and offset, and transmits power with a phase distribution corresponding to the selected range and offset. In some implementations, if the wireless transmitter has not received a power request signal, the wireless power transmitter can randomly (e.g., by guessing a location of a receiver) generate a phase distribution and transmit power with that phase distribution. Alternatively, the wireless transmitter can store in memory the previous range and offset of wireless devices that received power and begin transmitting power at a phase distribution according to that previously available information. Additionally, a wireless transmitter can begin transmitting power in an estimated direction based on a power request signal. For example, at block 405 a wireless transmitter can receive a power request signal that contains an approximate location of a device (e.g., GPS coordinate), and the wireless transmitter can transmit power in that direction. The wireless transmitter can divide a space into different angles and can transmit power in those different angles (e.g., in a sweeping algorithm). Also, the wireless transmitter can implement radar algorithms such as a monopulse or conical searching algorithm to estimate a location of client in space and begin transmitting power towards that location. In general, the wireless transmitter can transmit power at an angle relative to the aperture and continue to adjust phase of emitted EM waves to alter this angle. In some embodiments, the wireless transmitter can adjust phase of emitted EM waves to alter phase distribution on a client as described below.

At block 415, a wireless transmitter receives feedback from the client. After a wireless device receives some power, it can report back to the wireless transmitter the amount of power it received. For example, a mobile device can transmit the gradient of power that it is receiving and continue to request power until a local maximum of power is delivered. In some implementations, a mobile device continues to request more power until a threshold is reached. For example, a mobile device can receive 0.05 W of power and in response send a power request signal that it wants to receive 0.3 W of power. The wireless transmitter can receive this feedback power request signal and process the request. Alternatively, a wireless transmitter may not receive a feedback signal for a period of time and it may continue to sweep through a space to search for a client that needs power. For example, if a wireless transmitter is transmitting power at an angle or estimated range and offset, and does not receive a feedback signal after one minute, the wireless transmitter can shift its phase distribution to begin transmitting power to another space where a potential client is located.

At block 420, based on the feedback, the wireless transmitter modifies the phase distribution of the antenna or antennas. As an example, if the wireless transmitter is searching for a client in the range R of 1 to 10 meters, and the aperture has a radius r of 0.5 m, the wireless transmitter could execute the code below to determine the optimal phase distribution for transmitting power to the client. As shown below, the wireless transmitter could start at a range of 1 m and change the value of R by increments of 0.1 m up to 10 m. For each R value, the wireless transmitter would also compute a radius r. As shown below in the example outline code (e.g., MATLAB), the radius could start at 0 cm and increase by 0.01 cm up to 0.5 cm.

For R=1:0.1:10
   for r=0:0.01:0.5
     $\varphi = k\sqrt{R^2 + r^2}$
   End
End As the above example shows, if the power request signal requests more power, the wireless transmitter will continue to vary the values of R and r to determine a phase distribution that increases the power a client is receiving. If the power request signal indicates that the client is receiving a maximum amount of power, the wireless transmitter can continue to transmit power at that phase and cease to vary R and r.

At block 425, the wireless transmitter transmits power with the modified phase distribution from the aperture. For example, based on the equation above, the wireless transmitter can estimate a new R and r, and transmit power with a phase distribution that corresponds to these estimates. In general, the wireless transmitter has three variables that it can vary to increase power transfer (e.g., optimize phase distribution): x, y, and R, where x and y are horizontal and vertical distances between the center of the client and a projection of the aperture and R is the distance (range) between the aperture and client.

At decision block 430, the wireless transmitter determines whether the amount of power a client is receiving is increasing. For example, based on two consecutive power request signals that report the amount of power received by a client, the wireless transmitter can determine whether the amount of power a client is receiving is increasing, decreasing, or remaining the same. In some implementations, the wireless transmitter can receive a request from a user interface that instructs the wireless transmitter that the client is not receiving enough power or that the client can continue to receive more power.

Overall, the wireless transmitter continues to vary values of R and r based on the power request signal until the wireless device is receiving approximately a maximum amount of requested power. Once the receiver receives a maximum power signal, and then receives a decreased signal afterwards, the receiver may provide feedback to the transmitter that the previous angle or estimated range represented an optimal angle/estimated range.

At block 435, the wireless transmitter continues sending power to the client. In general, wireless devices can keep requesting power from a wireless transmitter until the devices are fully or adequately charged. In some implementations, a wireless transmitter can stop sending power if it has not received a power request signal for a certain period of time. For example, if a wireless device has not sent a power request signal for two minutes because the user left the room, the wireless transmitter can stop transmitting power to that device. In some implementations, process 400 can end once a client sends a signal that it has an adequate charge or in response to a user requesting that the wireless transmitter stop sending power. (Note, as generally used herein, the terms "receiver", "mobile device", "wireless device" and similar terms are used interchangeably herein.)

Figure 5:
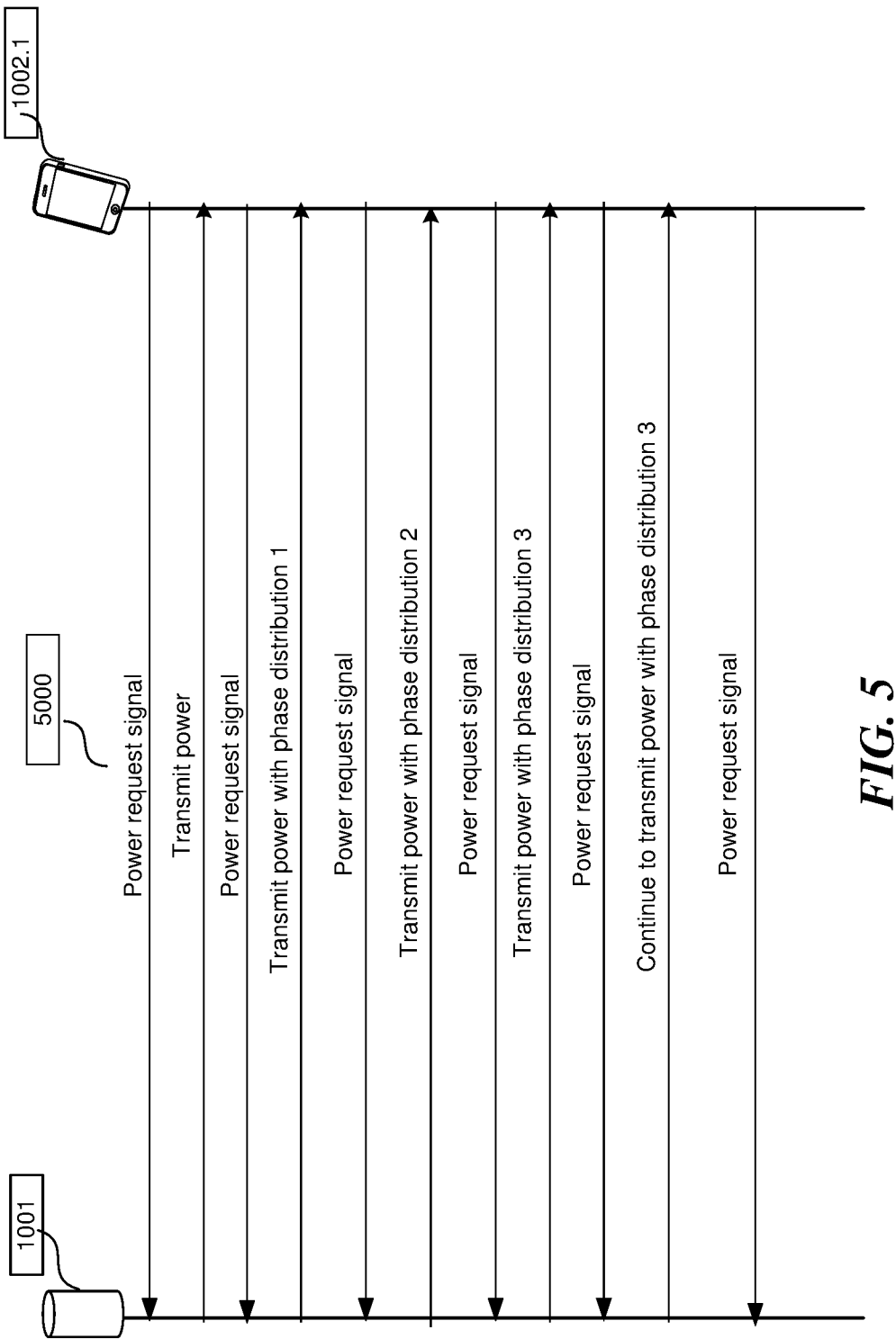
FIG. 5 is a sequence diagram for transmitting power to a client according to one or more embodiments of the present technology.

FIG. 5 is an example sequence diagram for transmitting power to a client. Similar to the process 400 described in FIG. 4, a client 1002.1 can initiate a protocol to receive power from a wireless transmitter 1001. For example, a client sends a power request signal to a wireless transmitter requesting power. The client can transmit this signal periodically, sporadically, or continuously based on certain conditions. For example, a client may determine that it has less than 10% battery life and transmit the power request signal to receive power. As another example, a client may periodically (e.g., once per day) request to receive power. Also, as shown in FIG. 5, the wireless transmitter can continue to vary the phase distribution transmitted to a client until the client is receiving enough power.

In some implementations, if a client is moving and includes an accelerometer, the client can transmit velocity or location information and the wireless transmitter can use the Doppler effect to better approximate the phase distribution at the client location. The Doppler equation states that if the frequency of the transmitted signal (f), c is 3×10$^8$ m/s which is the speed of light, and v is the speed of the client, where v≪c (with negative sign of v if the client is moving towards the transmitter), then the frequency observed by the transmitter is $f_o = (1-v/c)f$. Therefore, $\Delta f = f_o - f = -v\, f/c$.

Figure 6:
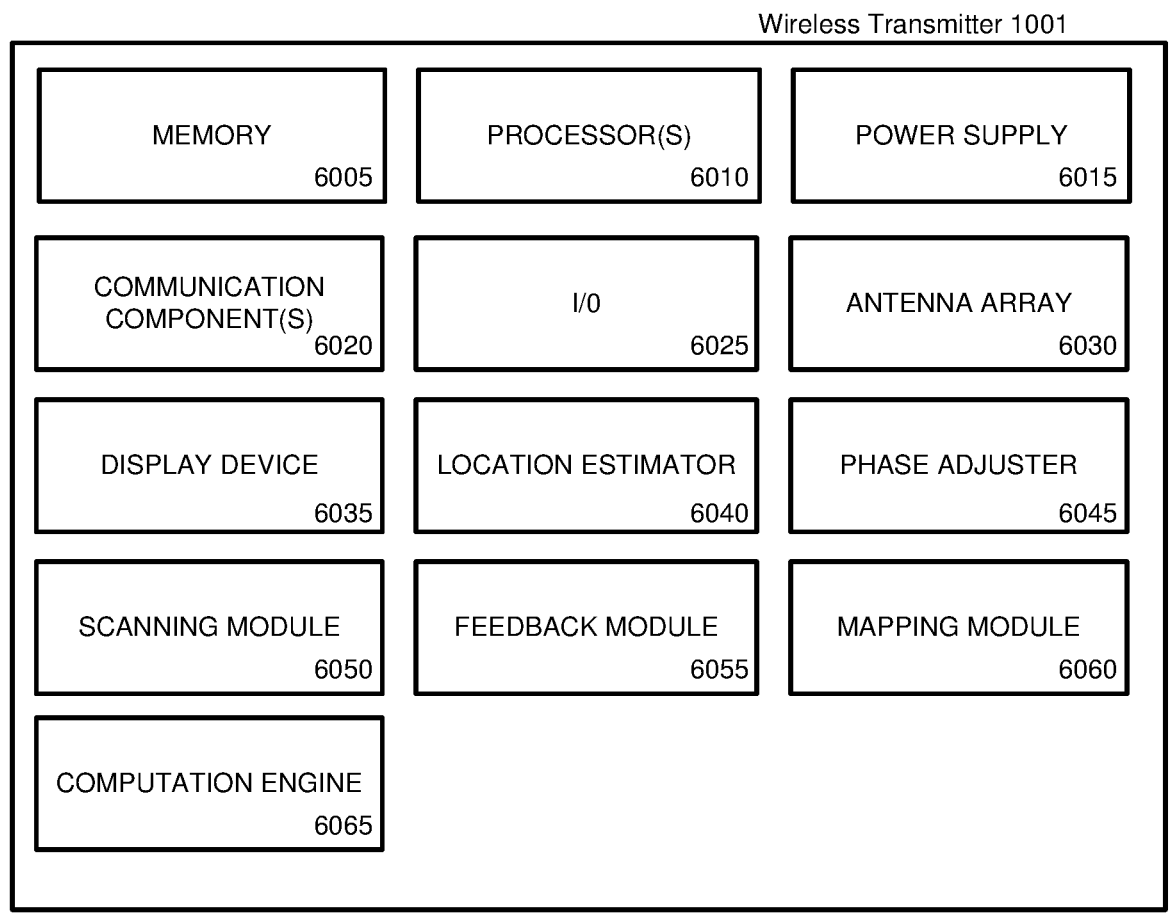
FIG. 6 is a block diagram illustrating an example of a set of components for a wireless transmitter that may be used in one or more embodiments of the present technology.

FIG. 6 is a block diagram of a set of components for a wireless transmitter 1001 that may be used in accordance with one or more embodiments of the present technology. According to the embodiments shown in FIG. 6, wireless power transmitter 10001 can include memory 6005, one or more processors 6010, power supply 6015, communication components 6020, I/O 6025, antenna array 6030, display device 6035, location estimator 6040, phase adjuster 6045, scanning module 6050, feedback module 6055, mapping module 6060, and computation engine 6065. Each of these components or modules can be embodied as special-purpose hardware (e.g., one or more ASICS, PLDs, FPGAs, or the like), or as programmable circuitry (e.g., one or more microprocessors, microcontrollers, or the like) appropriately programmed with software and/or firmware, or as a combination of special purpose hardware and programmable circuitry. Other embodiments of the present technology may include some, all, or none of these modules and components along with other modules, applications, and/or components. Still yet, some embodiments may incorporate two or more of these modules and components into a single module and/or associate a portion of the functionality of one or more of these modules with a different module. For example, in one embodiment, scanning module 6050 and mapping module 6060 can be combined into a single module or component. As another example, for considerations such as speed of data processing, amount and/or availability of data storage in memory, and reducing the size of the transceiver system 1001, a remote processor server (not shown) may partially or entirely replace one or more of the components in transceiver system 1001.

Memory 6005 can be any device, mechanism, or populated data structure used for storing information. In accordance with some embodiments of the present technology, memory 6005 can encompass any type of, but is not limited to, volatile memory, nonvolatile memory and dynamic memory. For example, memory 6005 can be random access memory, memory storage devices, optical memory devices, media magnetic media, floppy disks, magnetic tapes, hard drives, SDRAM, RDRAM, DDR RAM, erasable programmable read-only memories (EPROMs), electrically erasable programmable read-only memories (EEPROMs), compact disks, DVDs, and/or the like. In accordance with some embodiments, memory 6005 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 6005.

Memory 6005 may be used to store instructions for running one or more applications or modules on processor(s) 6010. For example, memory 6005 could be used in one or more embodiments to house all or some of the instructions needed to execute the functionality of communication components 6020, I/O 6025, antenna array 6030, display device 6035, location estimator 6040, phase adjuster 6045, scanning module 6050, feedback module 6055, mapping module 6060, and/or computation engine 6065. These components may cause wireless power transmitter 1001 to perform certain methods or functions described herein, and may include subcomponents or other logical entities that assist with or enable the performance of some or all of these methods or functions. In some embodiments, the components can execute algorithms such as a monopulse radar algorithm.

Transceiver system 1001 can include a power supply 6015 to provide power to the various components. Communication components 6020 can provide a variety of technologies for communicating with other components or devices. For example, in some embodiments, communication components 6020 can include a network interface device capable of receiving and transmitting data over a wired or wireless network communications protocol, including data retrieved from and/or stored in memory 6005 that is received from and/or transmitted to, respectively, client 1002 and/or test device, and/or a cloud-based application executed by one or more processors in a computing device of remote processor server.

I/O 6025 can include, by way of example but not limitation, a keyboard, a mouse or other pointing device, disk drives, printers, a scanner, and other input and/or output devices, including display device 6035. The display device 6035 can include, by way of example but not limitation, liquid crystal display (LCD), touch screen display, or some other applicable known or convenient display device.

Antenna array 6030 can include a plurality of antenna elements arranged within antenna array 6030 with a fixed geometry (not shown) relative to one another. In other embodiments, antenna array 6030 includes one antenna element. In still other embodiments, antenna array 6030 can include a plurality of antenna elements, but is capable of functioning in transceiver system 1001 to perform the processes and methods described herein when only a subset of the antenna elements are actually functioning for Tx, Rx, and/or power delivery.

Location estimator 6040 can estimate the location of a client device in space. Location estimator 6040 can execute algorithms to sweep a space to find a client device. For example, a wireless transmitter can execute a search algorithm using a conical scanning algorithm. Alternatively, target communicator 6035 can execute other algorithms for estimating a target's location in space such as monopulse algorithms or direction of arrival (DOA) estimation algorithms. In general, Location estimator 6040 can communicate radar or location information of a client to other components of the disclosed technology. For example, Location estimator 6040 can communicate with antennas that are receiving signals from client devices.

Phase adjuster 6045 can adjust the phase distribution of an emitted EM wave. In some implementations, the phase adjuster 6045 operates in the digital domain and uses phase coefficients and filters to change the phase of an EM wave. For example, phase adjuster 6045 can manipulate signals sent to antennas using weighted phase coefficients and a Fourier transform. Some other examples of algorithms that a phase adjuster 6045 can execute include a real least mean squares (LMS) algorithm, a complex LMS algorithm, recursive least squares (RLS) algorithm, or constant modulus algorithm (CMA). Alternatively, in other implementations, the phase adjuster 6045 controls the voltage of a capacitor or inductor to modify the phase in the analog domain (e.g., a voltage control phase shifter). In other examples, a phase adjuster 6045 can control a diode or diodes to adjust the phase of an emitted EM wave. Also, phase adjuster 6045 can communicate with other components of the disclosed technology such as the computation engine 6065 described below.

Scanning module 6050 can scan the local environment to collect data that can be used by mapping module 6060 to create a model (e.g., 2D, 3D, virtual reality model, augmented reality model, etc.) of a local environment that may be displayed on display device 6035 that is visible to a user. In some embodiments, the model may be transmitted to a computing device such as a laptop or desktop computer (not shown) of the user that is communicatively coupled to transceiver system 1001. In some embodiments, wireless power transmitter 1001 may include a three-dimensional (3D) scanner array (not shown) that acquires data representative of a physical layout of the environment. For example, this data may include distances between walls, distances between a ceiling and a floor, and relative positions of objects (e.g., furniture) in the room.

Using data from the 3D scanner array, mapping module 6060 can construct a detailed model of the local environment as precise and accurate as a measurement and data acquisition precision and accuracy of 3D scanner array. The 3D scanner array may include, for example and without limitation, scanning infrared (IR) and/or laser range-finding 3D mapping systems to generate a detailed model of 3D spaces such as a room. A user of transceiver system 1001 may interact with the 3D model stored in transceiver system 1001 and/or elsewhere to assign identifiers to portions (e.g., immovable objects like a window sill and or movable objects such as furniture) of the 3D model and also assign a name (e.g., master bedroom) to the 3D model. In other embodiments, transceiver system 1001 and/or other computing systems assign identifiers and/or names to the 3D model which are dynamically assigned as objects and/or other attributes of the respective 3D space change over time.

Feedback module 6055 can receive a variety of inputs, e.g., from the model or one or more client devices, that may be used in the computations for altering the phase distribution of the power transmission signal. These inputs may be used to track moving devices or more precisely lock-on to a position of the receiver (moving or not). Computation engine 6065 can compute a phase distribution for a wireless transmitter. In some embodiments, the computation engine 6065 can executes computer implementations of Equations 1-3 listed above and other equations in antenna theory. For example, computation engine 6065 can estimate an R and r, and based on these values compute a phase distribution for an array of antennas with an aperture. After a wireless transmitter receives feedback (e.g., a power request signal), computation engine 6065 can adjust the phase by computing a different R or r value. Also, computation engine 6065 can communicate with other components of the disclosed technology.

As shown in FIG. 6, wireless transmitter 1001 may include input/output (I/O) 6065. In general, the term I/O is used to describe any program, operation, or device that transfers data to or from wireless transmitter 1001 and to or from a peripheral device. Every transfer is an output from one device and an input into another. For example, wireless transmitter 1001 can be physically or wirelessly connected to a keyboard, mouse, or screen (e.g., LED or LCD screen).

Figure 7:
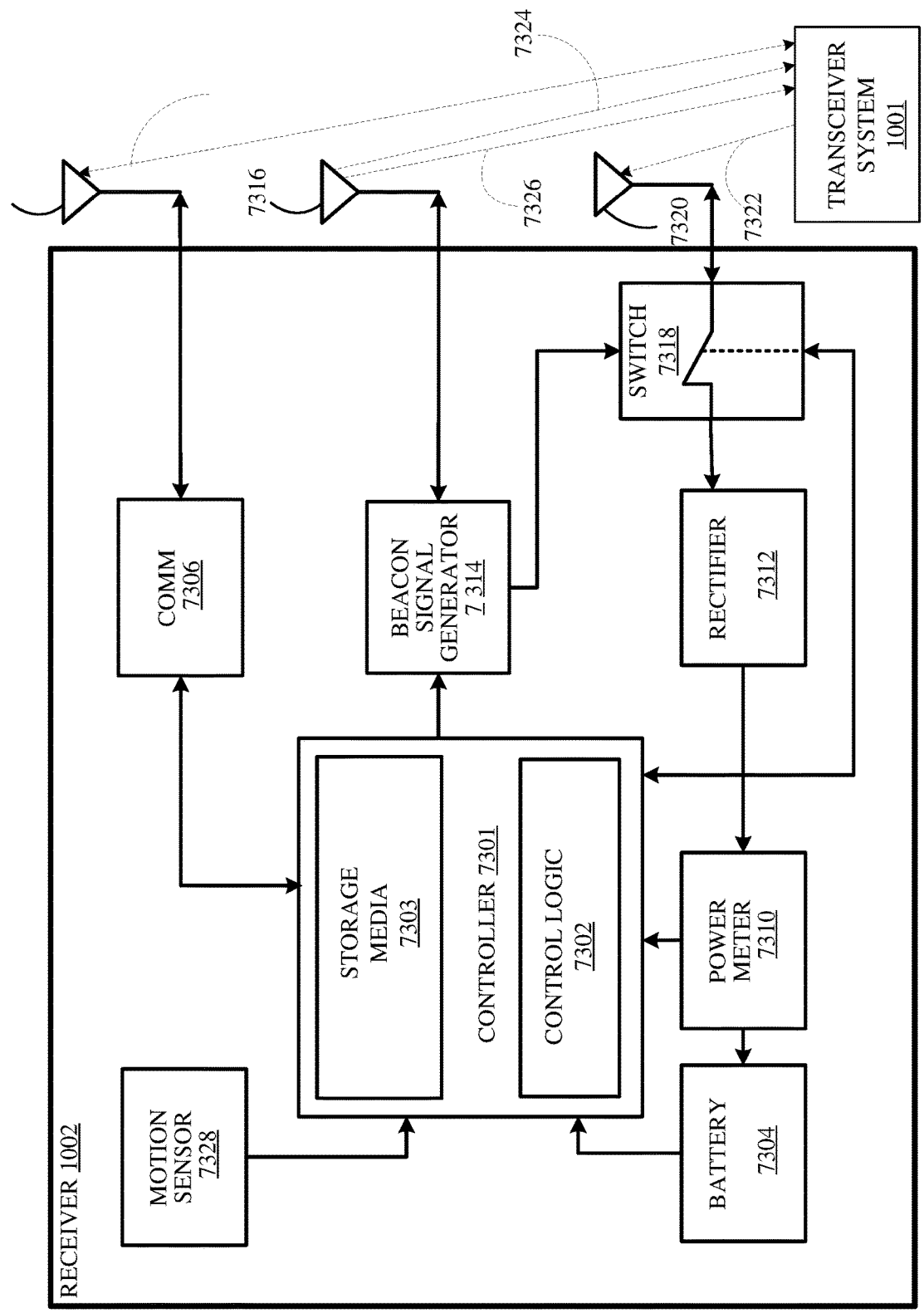
FIG. 7 is a block diagram illustrating an example of a set of components for a client device in accordance with one or more embodiments.

FIG. 7 is a block diagram illustrating an example client device 1002 in accordance with one or more embodiments. Client power receiver 1002 may include various functional components such as analog and digital electronic devices that are at least one of electrically and communicatively coupled together. The functional components of client device 1002 include a controller 7301 having control logic 7302 and data storage media 7303. Client device 1002 also includes a battery 7304, a communication block 7306 and an associated first antenna 7308, a power meter 7310, a rectifier 7312, a beacon signal generator 7314 and an associated second antenna 7316, and a switch 7318 alternately coupling the rectifier 7312 and the beacon signal generator 7314 to an associated third antenna 7320. Some or all of the above listed components of client device 1002 can be omitted in some embodiments. Additional or fewer components are also possible. For example, some embodiments may also include accelerometers to measure acceleration of the device or a global positioning system that can identify the global positioning coordinates of the receiver and estimate current velocity.

The rectifier 7312 receives (e.g., via the third antenna 7320) a power transmission signal 7322 from the transceiver system 1001, which is fed through the power meter 7310 to the battery 7304 for charging. The power meter 7310 measures the total received power signal strength and provides the control logic 7302 with this measurement. The control logic 7302 can also receive the battery power level from the battery 7304 itself or receive battery power level data from, for example, an application programming interface (API) of an operating system running on the client device 1002. The control logic 7302 can also transmit/receive, via the communication block 7306, a data signal on a data carrier frequency, such as the base signal clock for clock synchronization.

Using the second 7316 and/or third 7320 antennas, the beacon signal generator 7314 transmits a beacon signal 7324 or a calibration signal 7326 to transceiver system 1001. Furthermore, in the example embodiment, battery 7304, and the first 7308, second 7316, and third 7320 antennas are positioned in the client device 1002. In other embodiments, at least one of the battery 7304, and the first 7308, second 7316, and third 7320 antennas are positioned in the client device 1002. For example, and without limitation, some embodiments of client device 1002 can include a dedicated power supply such as a battery cell that may or may not be rechargeable through rectifier 7312 and/or a plug-in charger circuit of the client device 1002. Thus, in such other embodiments, during such times when client device 1002 is powered off, components of the system may remain fully capable of using the second 7316 and/or third 7320 antennas to transmit beacon signal 7324 and/or calibration signal 7326, as well as receive power transmission signal 7322, for purposes of client device 1002 localization and/or wireless power transmission system based battery 7304 charging. At least one of the first 7308, second 7316, and third 7320 antennas also enable client device to Tx/Rx a data signal 7327 to/from transceiver system 1001.

Although the battery 7304 shown in FIG. 7 is charged via WPTS through the circuit including rectifier 7312, the client device 1002 can also receive its supply power directly from the rectifier 7312 instead of, or in addition to client device 1002 being powered by battery 7304. Also, it can be noted that the use of multiple antennas (e.g., antennas 7308, 7316, and 7320) is one example of implementation of client device 1002 and as such, the structure can be reduced to one shared antenna, where the client device 1002 multiplexes signal reception and transmission.

Client device 1002 can also include a motion sensor 7328 capable of detecting motion and signaling the control logic 7302 of a motion event of client device 1002. Client device 1002 can also integrate additional motion detection mechanisms such as accelerometers, assisted global positioning system (GPS), or other mechanisms. Once motion sensor 7328 determines the motion event, control logic 7302 assumes that the motion event equates to the client device 1002. Control logic 7302 then signals the transceiver system 1001 modify the power transmission. In cases where the client device 1002 is used in a moving environment like a transceiver system 1001-equipped vehicle, power may be transmitted intermittently or at a reduced level until the device is close to losing all available power. Motion sensor 7328, as well as the aforementioned additional motion detection mechanisms may be integrated into client device 1002.

III. CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling or connection between the elements can be physical, logical, or a combination thereof. Additionally, the words "herein," "above," "below," and words of similar import, when used in this application, shall refer to this application as a whole and not to any particular portion of this application. Where the context permits, words in the above Detailed Description using the singular or plural number may also include the plural or singular number, respectively. The above Detailed Description of implementations of the disclosure is not intended to be exhaustive or to limit the teachings to the precise form disclosed above. While specific implementations of, and examples for, the disclosure are described above for illustrative purposes, various equivalent modifications are possible within the scope of the disclosure, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are, at times, shown as being performed in a series, these processes or blocks may instead be performed in parallel, or may be performed at different times. Further, any specific numbers noted herein are only examples: alternative implementations may employ differing values or ranges.

The teachings of the disclosure provided herein can be applied to other systems that are not necessarily the system described above. For example, the disclosed system can be applied to data transfer or data transfer combined with power transfer. As another example, the disclosed technology can be applied to medical devices such as targeting a power transfer to a tumor. The elements and acts of the various implementations described above can be combined to provide further implementations.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. For example, a wireless transmitter can have a CPU, application specific integrated circuit (ASIC), or a field-programmable gate array (FPGA). Also, specific implementations have been described herein for purposes of illustration, but various modifications can be made without deviating from the scope of the implementations. The specific features and acts described above are disclosed as example forms of implementing the claims that follow. Accordingly, the implementations are not limited except as by the appended claims.

Alternative language and synonyms may be used for any one or more of the terms discussed herein, and no special significance is to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various implementations given in this specification.

What is claimed is:

1. A wireless power transmitter comprising:
    a location estimator to estimate a location of a client device relative to the wireless power transmitter;
    a phase adjuster to compute, based on the estimate of the location of the client device, a phase distribution of a power transmission;
    an antenna array to send the power transmission with the phase distribution calculated by the phase adjuster; and
    a communications component to receive a power request signal from the client device,
    wherein the power request signal:
        identifies an amount of power requested by the client device, and
        includes movement data indicating one or more of an acceleration and a velocity of the client device, and
    wherein the location estimator and the phase adjuster:
        iteratively estimate the location and iteratively compute the phase distribution according to:
            one or more estimates of the location of the client device, and
            received power request signals indicating the client device requires increased power from the power transmission;
        or
        maintain the power transmission based on a current estimated location and computed phase distribution according to received power request signals indicating the client device is receiving adequate power.

2. The wireless power transmitter of claim 1, wherein the communications component is further configured to receive a feedback signal from the client device.

3. The wireless power transmitter of claim 1, further comprising a scanning module to cause the antenna array to scan through space with electromagnetic waves.

4. The wireless power transmitter of claim 3, further comprising an antenna aperture, wherein the location estimator uses responses from the scanning module to determine the location of the client device relative to the antenna aperture.

5. The wireless power transmitter of claim 1, wherein the communications component includes a Bluetooth receiver, and wherein the power request signal is transmitted from the client device using Bluetooth.

6. The wireless power transmitter of claim 1, wherein the location estimator identifies a distance and an angle of the client device relative to an aperture of the wireless power transmitter.

7. The wireless power transmitter of claim 2, further comprising a feedback module to compute, based on the feedback signal, a varying phase distribution.

8. The wireless power transmitter of claim 7, wherein the feedback signal includes power received at the client device.

9. The wireless power transmitter of claim 1, further comprising a mapping module to create a map of a local environment of the wireless power transmitter.

10. A method of operating a wireless power transmitter, the method comprising:
    estimating a location of a client device relative to the wireless power transmitter;
    computing, based on the estimate of the location of the client device, a phase distribution of a power transmission;
    sending, via an antenna array, the power transmission with the computed phase distribution; and
    receiving a power request signal initiated by the client device, wherein the power request signal:
        identifies an amount of power requested by the client device; and
        includes movement data indicating one or more of an acceleration and a velocity of the client device,
    the method further comprising:
        iteratively estimating the location and iteratively computing the phase distribution according to:
            one or more estimates of the location of the client device, and received power request signals indicating the client device requires increased power from the power transmission;
        or
        maintaining the power transmission based on a current estimated location and computed phase distribution according to received power request signals indicating the client device is receiving adequate power.

11. The method of claim 10, wherein receiving the power request signal comprises receiving the power request signal initiated by the client device that includes power data.

12. The method of claim 10, further comprising scanning through space with electromagnetic waves from the antenna array.

13. The method of claim 12, further comprising determining the location of the client device relative to an antenna aperture using results of the scanning.

14. The method of claim 10, wherein the power request signal is initiated by the client device using Bluetooth.

15. The method of claim 10, wherein estimating the location of the client device further comprises identifying a distance and an angle of the client device relative to an aperture of the wireless power transmitter.

16. The method of claim 10, further comprising:
    receiving a feedback signal from the client device; and
    computing, based on the feedback signal, a varying phase distribution.

17. The method of claim 16, wherein the feedback signal includes an indication of power received at the client device.

18. The method of claim 10, further comprising creating a map of a local environment associated with the wireless power transmitter.

19. A wireless power transmission system comprising:
    an antenna array having multiple radio frequency (RF) transceivers;
    a communications component; and
    control circuitry configured to:
        estimate a location of a client device relative to the wireless power transmission system;
        compute, based on the estimate of the location of the client device, a phase distribution of a power transmission;
        direct the antenna array to send the power transmission with the computed phase distribution; and
        receive, via the communications component, a power request signal initiated by the client device,
    wherein the power request signal:
        identifies an amount of power requested by the client device; and
        includes movement data indicating one or more of an acceleration and a velocity of the client device, and
    wherein the control circuitry further configured to:
        iteratively estimate the location and iteratively compute the phase distribution according to:
            one or more estimates of the location of the client device, and
            received power request signals indicating the client device requires increased power from the power transmission;
        or
        maintain the power transmission based on a current estimated location and computed phase distribution according to received power request signals indicating the client device is receiving adequate power.

20. The wireless power transmission system of claim 19, wherein the control circuitry is further configured to:
    scan through space with electromagnetic waves from the antenna array; and
    determine the location of the client device relative to an antenna aperture using results of the scanning.

* * * * *